(12) United States Patent
Kwon et al.

(10) Patent No.: US 12,056,310 B2
(45) Date of Patent: Aug. 6, 2024

(54) ELECTRONIC DEVICE, AND METHOD FOR DISPLAYING ELECTRONIC PEN POINTER OF ELECTRONIC DEVICE

(71) Applicant: SAMSUNG ELECTRONICS CO., LTD., Suwon-si (KR)

(72) Inventors: Hyunwoong Kwon, Suwon-si (KR); Banghyun Kwon, Suwon-si (KR); Inhyung Jung, Suwon-si (KR); Sangheon Kim, Suwon-si (KR); Yeunwook Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/224,349

(22) Filed: Jul. 20, 2023

(65) Prior Publication Data
US 2023/0367420 A1 Nov. 16, 2023

Related U.S. Application Data

(63) Continuation of application No. PCT/KR2022/001017, filed on Jan. 20, 2022.

(30) Foreign Application Priority Data

Jan. 20, 2021 (KR) .................. 10-2021-0008016

(51) Int. Cl.
*G06F 3/041* (2006.01)
*G06F 3/0354* (2013.01)
*G06F 3/04883* (2022.01)

(52) U.S. Cl.
CPC ...... *G06F 3/04166* (2019.05); *G06F 3/03545* (2013.01); *G06F 3/04883* (2013.01)

(58) Field of Classification Search
CPC .............. G06F 3/0346; G06F 3/03545; G06F 3/04166; G06F 3/04883
See application file for complete search history.

(56) References Cited

U.S. PATENT DOCUMENTS 9,400,570 B2 * 7/2016 Chang .................. G06F 3/0383
9,454,272 B2    9/2016 Ningrat et al.
(Continued)

FOREIGN PATENT DOCUMENTS

CN       104484061 A     4/2015
JP       2015-203955 A   11/2015
(Continued)

OTHER PUBLICATIONS

Machine translation of JP 2015-203955 (Year: 2023).*
(Continued)

*Primary Examiner* — Michael Pervan
(74) *Attorney, Agent, or Firm* — Sughrue Mion, PLLC

(57) ABSTRACT

An electronic device may include a communication module; memory; a display module; and a processor. The processor may determine that an electronic pen event associated with an electronic pen is being executed; receive one or more pieces of motion information from the electronic pen; buffer one or more pieces of motion information into the memory; determine pen pointer coordinates on the display module based on the buffered one or more pieces of motion information; and display a pen pointer on the display module on the basis of the determined pen pointer coordinates and one or more pieces of motion information.

15 Claims, 21 Drawing Sheets

(56) References Cited

U.S. PATENT DOCUMENTS

| | | | |
|---|---|---|---|
| 9,465,456 | B2 | 10/2016 | Pant et al. |
| 9,529,463 | B1 | 12/2016 | Ramani et al. |
| 9,933,883 | B2* | 4/2018 | Kim ................. G06F 3/0416 |
| 9,946,398 | B2* | 4/2018 | De Araujo ............ G09G 5/006 |
| 9,971,443 | B2* | 5/2018 | Rodrigues De Araujo ................. G06F 3/04166 |
| 10,031,613 | B2 | 7/2018 | Jeong et al. |
| 10,365,765 | B2 | 7/2019 | Lee et al. |
| 10,402,009 | B2 | 9/2019 | De Araujo et al. |
| 10,534,464 | B2 | 1/2020 | Gur et al. |
| 10,642,376 | B2* | 5/2020 | Trethewey ............ G06F 3/0488 |
| 10,719,148 | B2 | 7/2020 | Gilbert et al. |
| 11,009,994 | B2* | 5/2021 | De Araujo .......... G06F 3/04166 |
| 11,243,617 | B2* | 2/2022 | Trethewey ............ G06F 3/0346 |
| 11,327,577 | B2* | 5/2022 | Trethewey ............ G06F 3/0346 |
| 11,353,970 | B2* | 6/2022 | Yeom ................. G06F 3/04162 |
| 11,556,246 | B2* | 1/2023 | Yoon ................. G06F 3/017 |
| 2014/0055427 | A1 | 2/2014 | Kim et al. |
| 2014/0146021 | A1* | 5/2014 | Trethewey ............ G06F 3/0488 345/179 |
| 2015/0355778 | A1 | 12/2015 | Kim et al. |
| 2016/0139690 | A1* | 5/2016 | Chang ................. G06F 3/0338 345/179 |
| 2016/0188088 | A1* | 6/2016 | Rodrigues De Araujo ................. G06F 3/04166 345/173 |
| 2016/0299606 | A1 | 10/2016 | Go |
| 2017/0031465 | A1 | 2/2017 | Jung et al. |
| 2017/0083156 | A1* | 3/2017 | Lee ................. G06F 3/0485 |
| 2017/0235411 | A1* | 8/2017 | De Araujo ............ G09G 3/20 345/173 |
| 2018/0032154 | A1* | 2/2018 | Yao ................. G06F 3/04817 |
| 2018/0260074 | A1* | 9/2018 | De Araujo ............ G09G 5/395 |
| 2019/0384448 | A1* | 12/2019 | De Araujo ............ G09G 5/395 |
| 2021/0096742 | A1* | 4/2021 | Yoon ................. G06F 3/04883 |
| 2021/0124439 | A1* | 4/2021 | Yeom ................. G06F 3/04162 |
| 2021/0165504 | A1* | 6/2021 | Trethewey ............ G06F 3/0346 |
| 2021/0165505 | A1* | 6/2021 | Trethewey ............ G06F 3/0488 |
| 2022/0187930 | A1* | 6/2022 | Kang ................. G06F 3/017 |
| 2022/0374092 | A1* | 11/2022 | Trethewey ............ G06F 3/0346 |
| 2022/0413637 | A1 | 12/2022 | Wu et al. |
| 2023/0004234 | A1* | 1/2023 | Jung ................. G06F 3/017 |

FOREIGN PATENT DOCUMENTS

| | | | |
|---|---|---|---|
| JP | 2017-111648 A | | 6/2017 |
| KR | 10-2004-0035020 A | | 4/2004 |
| KR | 10-2014-0026711 A | | 3/2014 |
| KR | 10-2014-0103777 A | | 8/2014 |
| KR | 10-2017-0015777 A | | 2/2017 |
| KR | 10-2017-0033656 A | | 3/2017 |
| KR | 10-2017-0084118 A | | 7/2017 |
| KR | 10-2043148 B1 | | 11/2019 |
| WO | WO-2021187837 A1 * | 9/2021 | ........... G06F 3/0346 |

OTHER PUBLICATIONS

Communication dated Apr. 20, 2022, issued by the International Searching Authority in counterpart International Application No. PCT/KR2022/001017 (PCT/ISA/210).

Communication dated Apr. 20, 2022, issued by the International Searching Authority in counterpart International Application No. PCT/KR2022/001017 (PCT/ISA/237).

* cited by examiner

ELECTRONIC DEVICE, AND METHOD FOR DISPLAYING ELECTRONIC PEN POINTER OF ELECTRONIC DEVICE

CROSS-REFERENCE TO RELATED APPLICATIONS

The present application is a bypass continuation of International Application No. PCT/KR2022/001017, filed in the Korean Intellectual Property Office on Jan. 20, 2022, which claims priority from Korean Patent Application No. 10-2021-0008016, filed in the Korean Intellectual Property Office on Jan. 20, 2021, the disclosures of which are incorporated by reference herein in their entireties.

TECHNICAL FIELD

Various embodiments of the present disclosure relate to an electronic device, and a method for displaying an electronic pen pointer of the electronic device.

BACKGROUND ART

An electronic device may receive user input via a touchscreen, and may be provided with additional input means such as an electronic pen to allow a user to make more precise touch or hover inputs. The electronic pen may be mounted in an internal or external space of the electronic device, or may be a separate constituent.

In addition to displaying a visual effect on a screen for touch input, the electronic device may display a visual effect on the screen for input from the electronic pen. For example, the electronic device may provide user convenience by displaying a graphical object, such as a pen pointer, in response to the input of the electronic pen.

SUMMARY

In general, an input device, such as the electronic pen, may transmit motion and/or position information on the electronic pen to the electronic device, and the electronic device may generate coordinates on the basis of the motion and/or position information received from the electronic pen to display a pen pointer of the electronic pen on the display. However, the electronic device may cause the motion of the electronic pen pointer on the display of the electronic device to be unnatural in case that the motion and/or position information of the electronic pen is transmitted with a delay.

An electronic device, and a method for displaying an electronic pen pointer of the electronic device according to various embodiments of the present disclosure are aimed at smoothly displaying a motion of the electronic pen pointer on a display, even when motion and/or position information on the electronic pen is transmitted to the electronic device with a delay.

Technical problems to be solved by the present disclosure are not limited to the above-mentioned technical problems, and other technical problems, which are not mentioned above, may be clearly understood from the following descriptions by those skilled in the art to which the present disclosure pertains.

An electronic device according to various embodiments may include: a communication module; memory; a display module; and a processor. The processor may be configured to determine that an electronic pen event associated with an electronic pen is being executed; receive one or more pieces of motion information from the electronic pen; buffer one or more pieces of motion information into the memory; determine pen pointer coordinates on the display module based on the buffered one or more pieces of motion information; and display a pen pointer on the display module on the basis of the determined pen pointer coordinates and one or more pieces of motion information.

A method of displaying an electronic pen pointer on an electronic device according to various embodiments may include: determining that an electronic pen event associated with an electronic pen is being executed; receiving one or more pieces of motion information from the electronic pen; buffering one or more pieces of motion information into a memory; determining pen pointer coordinates on a display module based on the buffered one or more pieces of motion information; and displaying a pen pointer on the display module based on the predicted pen pointer coordinates and one or more pieces of motion information.

In the electronic device and the method for displaying the electronic pen pointer of the electronic device according to various embodiments of the present disclosure, by predicting and displaying the coordinates of the electronic pen pointer on the basis of the motion and/or position information of the electronic pen, the motion of the electronic pen pointer displayed on the display may be displayed naturally.

In addition, various effects that can be directly or indirectly identified through the present document may be provided.

DETAILED DISCLOSURE

Figure 1:
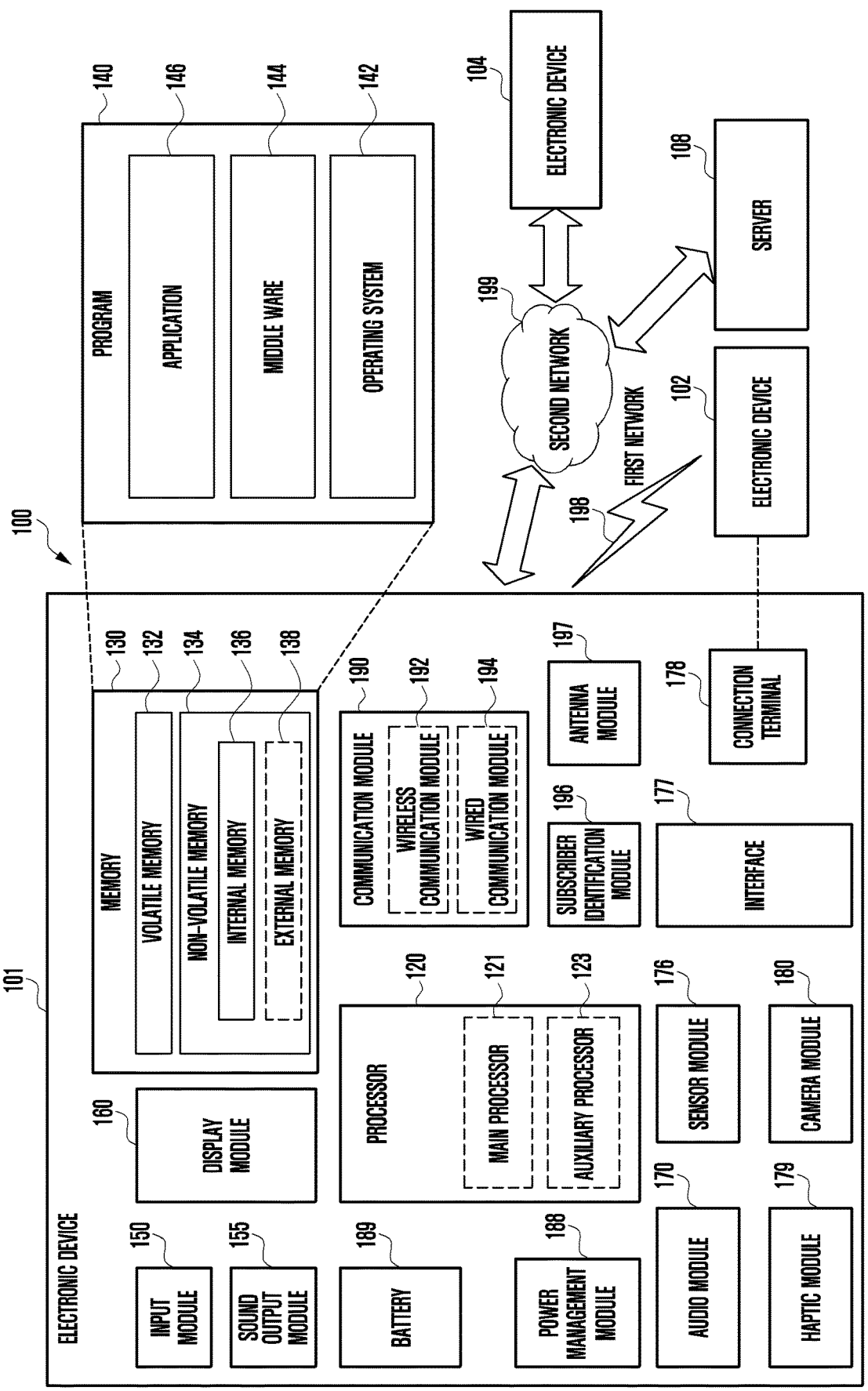
FIG. 1 is a block diagram of an electronic device in a network environment, according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
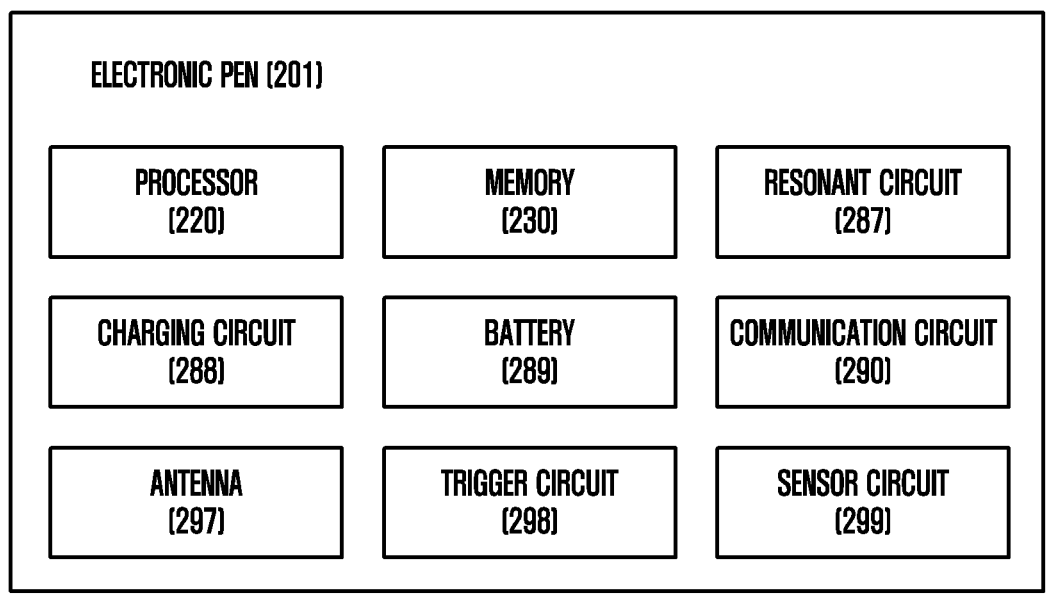
FIG. 2 is a block diagram illustrating an electronic pen according to various embodiments.

FIG. 2 is a block diagram illustrating an electronic pen according to various embodiments.

With reference to FIG. 2, an electronic pen 201 according to an embodiment may include a pen processor 220, a memory 230, a resonant circuit 287, a charging circuit 288, a battery 289, a communication circuit 290, an antenna 297, a trigger circuit 298 and/or a sensor circuit 299. In some embodiments, the pen processor 220, at least a portion of the resonant circuit 287, and/or at least a portion of the communication circuit 290 of the digital pen 201 may be constituted on a printed circuit board or in the form of a chip. The pen processor 220, resonant circuit 287, and/or communication circuit 290 may be electrically connected with the memory 230, the charging circuit 288, the battery 289, the antenna 297, the trigger circuit 298 and/or the sensor circuit 299. The electronic pen 201 according to an embodiment may be constituted by only the resonant circuit 287 and a button.

The pen processor 220 may include a generic processor constituted to execute a customized hardware module or software (e.g., an application program). The pen processor 220 may include hardware constituent elements (functions) or software elements (programs) that include at least one of various sensors provided in the electronic pen 201, a data measurement module, an input/output interface, a module to manage a state or environment of the electronic pen 201, or a communication module. The pen processor 220 may include one or more combinations of hardware, software, or firmware, for example.

According to an embodiment, the pen processor 220 may be configured to transmit information indicating a pressed state of the button, sensing information obtained by the sensor circuit 299, and/or information calculated on the basis of the sensing (e.g., information related to a position of the electronic pen 201), to the electronic device 101 via the communication circuit 290.

The resonant circuit 287 may include a coil (or an inductor) and/or a capacitor. The resonant circuit 287 may be resonant based on an electromagnetic field signal generated by a digitizer of the electronic device 101 (e.g., the display module 160 in FIG. 1), and may radiate an electro-magnetic resonance (EMR) input signal (or magnetic field) by resonance. In case that the electronic pen 201 transmits a signal by EMR method, the electronic pen 201 may generate a signal including a resonant frequency based on an electromagnetic field generated by an inductive panel of the electronic device 101. In case that the electronic pen 201 transmits a signal by the AES method, the electronic pen 201 may utilize capacity coupling with the electronic device 101 to generate the signal. In case that the electronic pen 201 transmits a signal by the ECR method, the electronic pen 201 may generate a signal including a resonant frequency based on an electric field generated by a capacitive device of the electronic device.

The electronic device 101 may identify a position of the electronic pen 201 on the electronic device 101 using the electro-magnetic resonance input signal. For example, the electronic device 101 may identify the position of the electronic pen 201 based on magnitude of an induced electromotive force (e.g., output current) generated by the electro-magnetic resonance input signal in each of a plurality of channels (e.g., a plurality of loop coils) in the digitizer. Meanwhile, while the electronic device 101 and electronic pen 201 have been described above as operating based on the EMR method, this is merely illustrative, and the electronic device 101 may also generate a signal based on an electric field on the basis of an electrically coupled resonance (ECR) method. The resonant circuit of the electronic pen 201 may be resonated by an electric field. The electronic device 101 may identify potentials in a plurality of channels (e.g., electrodes) due to resonance in the electronic pen 201, and may identify the position of the electronic pen 201 on the basis of the potentials. The electronic pen 201 may be implemented in an active electrostatic (AES) method, and those skilled in the art will understand that types of implementations are not limited.

According to an embodiment, the resonant circuit 287 may be utilized to change intensity or frequency of an electromagnetic field based on a user's operational state. For example, the resonant circuit 287 may provide a variety of frequencies to recognize a hovering input, a drawing input, a button input, or an erasing input. For example, the resonant circuit 287 may provide various resonant frequencies based on combinations of connections of a plurality of capacitors, or may provide various resonant frequencies based on variable inductors and/or variable capacitors.

The memory 240 may store information related to an operation of the electronic pen 201. For example, the information may include information on communicating with the electronic device 101 and frequency information related to an input operation of the electronic pen 201. Additionally, the memory 240 may store a program (or an application, an algorithm, or a processing loop) for calculating information on the position of the electronic pen 201 (e.g., coordinates information and/or displacement information) from sensing data from the sensor circuit 299. The memory 240 may also store a communication stack of the communication circuit 290. The communication circuit 290 and/or the pen processor 220 may also include a dedicated memory, depending on the implementation.

The communication circuit 290 may be constituted to perform a wireless communication function between the electronic pen 201 and the communication module 190 of the electronic device 101. According to an embodiment, the communication circuit 290 may transmit state information, input information, and/or position related information on the electronic pen 201 to the electronic device 101 using a short-range communication method. For example, the communication circuit 290 may transmit to the electronic device 101 direction information (e.g., motion sensor data) on the electronic pen 201 obtained by the sensor circuit 299, voice information inputted by a microphone, or battery level information on the battery 289. For example, the communication circuit 290 may transmit sensing data obtained from the sensor circuit 299 and/or information related to the position of the electronic pen 201 identified on the basis of the sensing data to the electronic device 101. For example, the communication circuit 290 may transmit to the electronic device 101 information on a state of the button included in the electronic pen 201 obtained via the trigger circuit 298. In an example, the short-range communication method may include at least one of Bluetooth, bluetooth low energy (BLE) NFC, Wi-Fi direct, or WLAN, but is not limited thereto.

The antenna 297 may be utilized to transmit signals or power to, or receive from, an external source (e.g., the electronic device 101). According to an embodiment, the electronic pen 201 may include a plurality of antennas 297, of which at least one antenna 297 may be selected that is suitable for a communication method. The communication circuit 290 may exchange signals or power with an external electronic device by means of the selected at least one antenna 297.

The trigger circuit 298 may include at least one button. According to an embodiment, the trigger circuit 298 may utilize an input signal from a button to transmit a trigger signal to the electronic device 101.

According to an embodiment, the pen processor 220 may identify an input method (e.g., touch or press) or type (e.g., EMR button or BLE button) of a button on the electronic pen 201 on the basis of the received trigger signal.

The sensor circuit 299 may generate an electrical signal or a data value that corresponds to an internal operational state of the electronic pen 201, or an external environmental state. For example, the sensor circuit 299 may include at least one of a motion sensor, a battery level detection sensor, a pressure sensor, a light sensor, a temperature sensor, a geomagnetic sensor, or a biometric sensor.

The sensor circuit 299 may include an accelerometer, a gyro sensor, and/or a geomagnetic sensor. The accelerometer may sense information on a linear motion of the electronic pen 201. The gyro sensor may sense information related to a rotation of the electronic pen 201. The geomagnetic sensor may sense information on a tilted state (e.g., orientation) of the electronic pen 201. The pen processor 220 may transmit information obtained from the sensor circuit 299 to the electronic device 101 via the communication circuit 290. Alternatively, the pen processor 220 may transmit information related to the position of the electronic pen 201 (e.g., coordinates of the electronic pen 201 and/or displacement of the electronic pen 201) to the electronic device 101 via the communication circuit 290, on the basis of information obtained from the sensor circuit 299.

Figure 3:
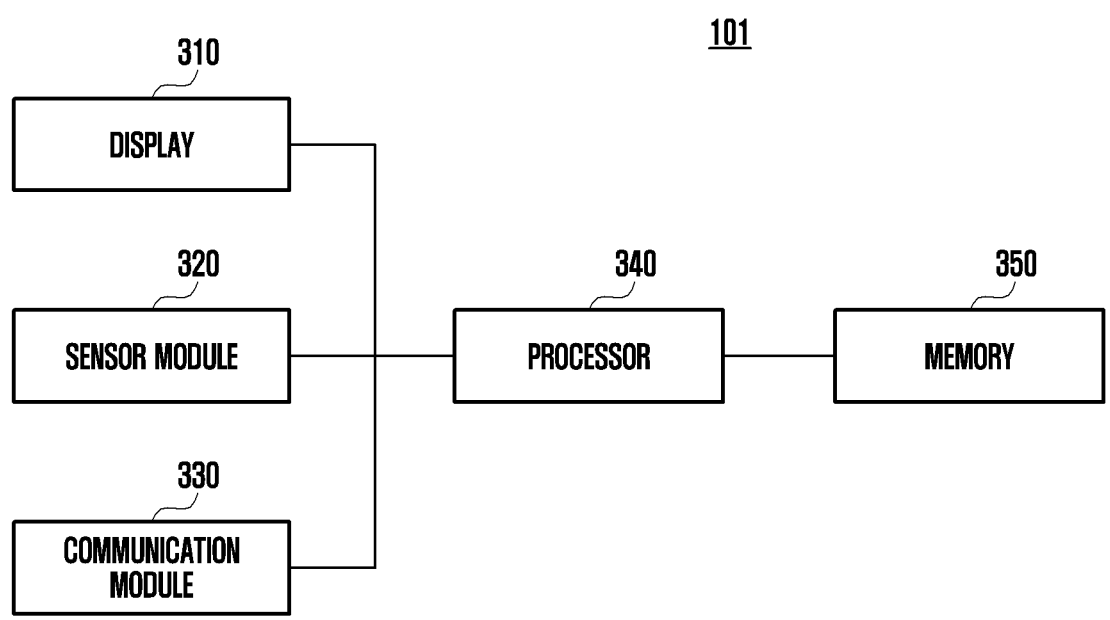
FIG. 3 illustrates a block diagram of an electronic device according to various embodiments of the present disclosure.

FIG. 3 illustrates a block diagram of an electronic device according to various embodiments of the present disclosure.

With reference to FIG. 3, the electronic device 101 according to an embodiment may include a display 310 (e.g., the display module 160 in FIG. 1), a sensor module 320 (e.g., the sensor module 176 in FIG. 1), a communication module 330 (e.g., the communication module 190 in FIG. 1), a processor 340 (e.g., the processor 120 in FIG. 1), and/or a memory 350 (e.g., the memory 130 in FIG. 1).

According to an embodiment, the electronic device 101 may accommodate or attach an electronic pen (e.g., the electronic pen 201 in FIG. 2) to an inner space or an outer space of the electronic device 101, but is not limited thereto. According to some embodiments, the electronic pen 201 may be constituted as a separate external input device.

The display 310 may include input and output devices that perform an input function and a display function. The display 310 may include at least some of the functions of the display module 160 in FIG. 1 and/or the input module 150 in FIG. 1. The display 310 may refer to a flat display or a flexible display. The display 310 may include at least one display. The display 310 may display graphical user interface (GUI) elements and/or visual information (e.g., text, graphics, images, video, or a combination thereof).

According to an embodiment, the display 310 may be coupled or disposed adjacent to a touch detection circuit, a pressure sensor that may measure intensity (pressure) of a touch, and/or a digitizer circuit that detects the electronic pen 201. The display 310 may be a touch-sensitive display. The touch sensitive display may detect touch, touch gesture, air gesture, or hover (or proximity touch) input using a user's finger (or other body parts). The touch-sensitive display may detect touch, air command, or hover input from the electronic pen 201.

According to an embodiment, the display 310 may execute functions in response to input signals from the electronic pen 201 and display a user interface (UI) therefor. For example, the display 310 may provide a user with a pen-themed UI related to the electronic pen 201.

The sensor module 320 may include a sensor that may detect at least one of situations on the display 310, for example, a folding state of the electronic device 101 or a folding state of the display 310, an active area of the display 310, or a direction in which a user is viewing the display 310. The sensor module 320 may include at least some of the constitutions and/or functions of the sensor module 176 in FIG. 1.

According to some embodiments, the sensor module 320 may detect whether the electronic pen 201 is detached. For example, the sensor module 320 may detect whether the electronic pen 201 is attached or detached based on a value of a change in magnetic force, and transmit a detected attachment/detachment signal of the electronic device 101 to the processor 340.

According to an embodiment, the sensor module 320 may be the same or similar to the sensor circuit 299 or the sensor module included in the electronic pen 201. For example, the sensor module 320 may be configured to control the electronic device 101 using the sensor circuit 299 of the electronic pen 201 when the electronic pen 201 is used, which may be communicatively connected.

The communication module 330 may perform a near-field communication connection with the electronic pen 201 (e.g., a stylus pen removed from the electronic device, a stylus pen separated from the electronic device). The communication module 330 may communicate with the electronic pen 201 using one of a variety of short-range wireless communication methods, such as, but not limited to, bluetooth low energy (BLE) technology. The communication module 330 may perform a communication connection with the electronic pen 201 in case that the electronic pen 201 is positioned at a distance that allows for a short-range communication connection. The communication module 330, according to various embodiments, may include at least some of the constitutions and/or functions of the communication module 190 in FIG. 1.

In an example, the communication module 330 may receive electronic pen information (or sensor information) from the electronic pen 201. For example, the electronic pen information may include at least one of coordinates information and tilt information related to a hover input, or action coordinates information related to an air command.

The processor 340 is a constituent capable of performing calculations or data processing related to a control and/or a communication of respective constituent elements of the electronic device 101, and may include at least some of the constitutions and/or functions of the processor 120 in FIG. 1. Operations of the processor 340 that will be described below may be performed by loading instructions stored in the memory 350.

The memory 350 is operatively connected to the processor 340 and may store data and various instructions that may be performed by the processor 340. These instructions may include arithmetic and logic calculations, data movement, or control instructions such as inputs and outputs that may be recognized by the processor 340.

The memory 350 may store a program for executing a function in response to a control signal based on an input from the electronic pen 201, or a program (or application) that supports a configuration of an electronic pen theme.

According to an embodiment, the processor 340 may execute a pen-themed application (hereinafter, an app) to display a user interface provided by the pen-themed app on the display 310. The pen-themed app may be an app that is capable of changing and/or configuring graphical objects related to the electronic pen 201 (e.g., an air command UI, or an electronic pen pointer object) or pen sounds according to user preference.

According to an embodiment, the processor 340 may control an execution of operations or functions related to the pen-themed app. The processor 340 may display an electronic pen pointer in response to a hover input from the electronic pen 201. For example, the processor 340 may display a default configured hover object (e.g., a dot pointer). The processor 340 may display a deformed hover object (e.g., a deformed pointer) with a pen theme applied in case that a user changes an electronic pen pointer theme by means of a pen-themed app.

According to an embodiment, the processor 340 may adaptively (or real-time, automatically) determine a direction and coordinates of the electronic pen pointer displayed on the display 310 in consideration of at least one of visual characteristics of the electronic pen pointer, a situation on the electronic pen 201, and a situation on the display 310 to change the position of the electronic pen pointer.

Figure 4:
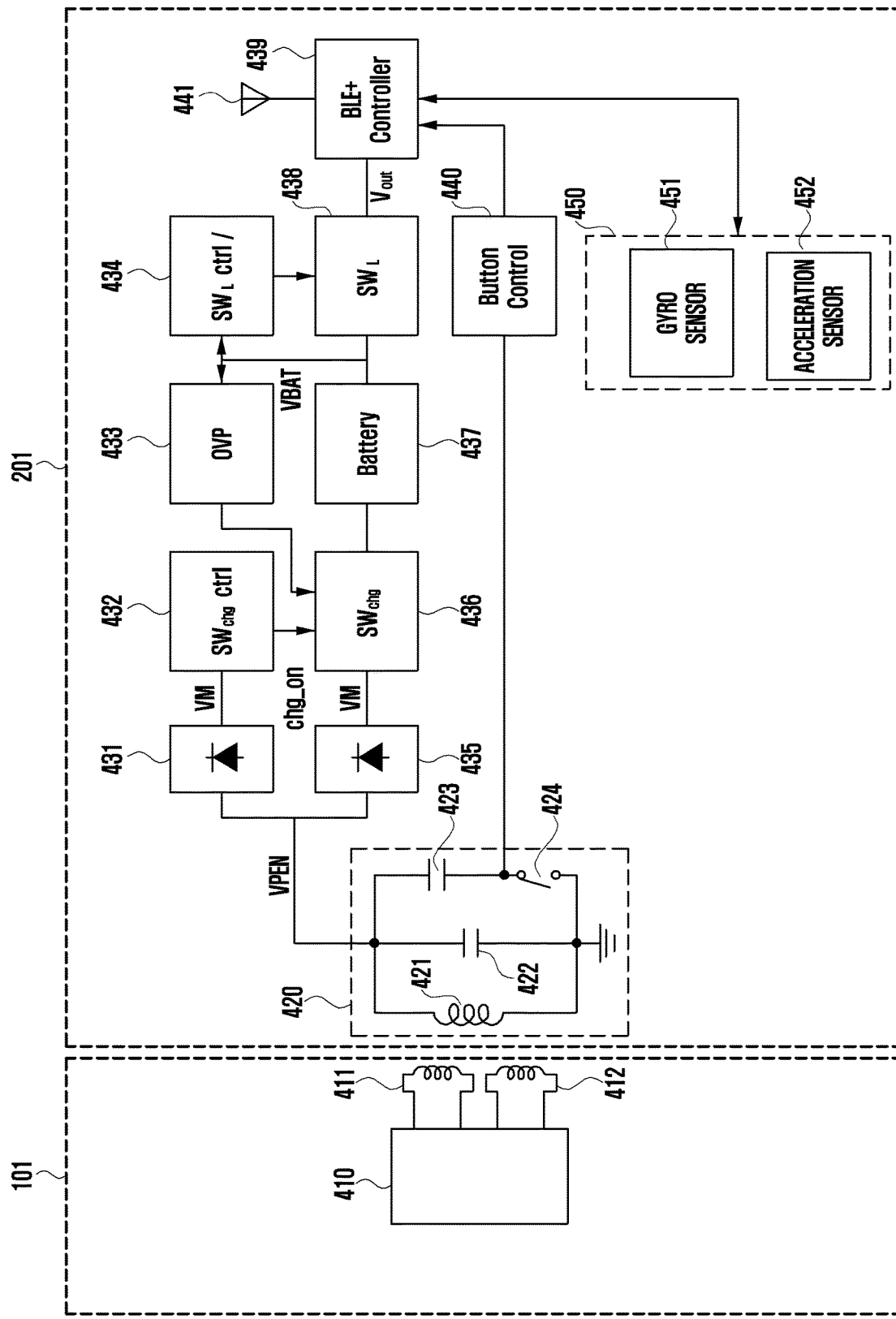
FIG. 4 is a view illustrating a constitution of the electronic device and an external electronic device according to various embodiments of the present disclosure.

FIG. 4 is a view illustrating a constitution of an electronic device and an electronic pen according to various embodiments of the present disclosure.

With reference to FIG. 4, according to an embodiment, an electronic device (e.g., the electronic device 101 in FIG. 1, 3, or 4) may be in communication with an electronic pen (e.g., the electronic pen 201 in FIGS. 2 and 4). The electronic device 101 and the electronic pen 201 may communicate using at least one of a communication circuit and various methods of short-range wireless communication. For example, the short-range wireless communication method may be bluetooth low energy (BLE) communication, but is not limited thereto.

The electronic device 101 may include a pen controller 410 (e.g., the processor 120 in FIG. 1 or the processor 340 in FIG. 3).

The pen controller 410 may include, for example, at least one amplifier (not illustrated) connected to the at least one of coils 411 and 412. The pen controller 410 may include at least one of the coils 411 and 412, and may provide chargeable power to the electronic pen 201 via at least one of the coils 411 and 412.

According to an embodiment, the at least one of the coils 411 and 412 may be disposed at a position that is physically adjacent to a coil 421 of the electronic pen 201 in case that the electronic pen 201 is inserted into the inner space of the electronic device 101, but there is no limitation on the position of disposition. Meanwhile, the insertion into the inner space is exemplary, and the electronic device 101 may include, in addition to the inner space, an area (or space) to which the electronic pen 201 may be mounted (or attached), in which case the electronic pen 201 may be detachable from the area (or space). At least some of functions of the pen controller 410 may be performed by the processor 120, or the pen controller 410 and the processor 120 may be integrated and implemented to perform at least some of the functions.

In an example, the pen controller 410 may include a control circuit (e.g., a control circuit independent of the processor 120), an inverter, and/or an amplifier in addition to the at least one of the coils 411 and 412.

The resonant circuit 420 of the electronic pen 201 (e.g., the resonant circuit 287 in FIG. 2) may include a coil 421, at least one of capacitors 422 and 423, and/or a switch 424. In case that the switch 424 is off, the coil 421 and the capacitor 422 may constitute a resonant circuit, and in case that the switch 424 is on, the coil 421 and the capacitors 422, and 423 may constitute a resonant circuit. Accordingly, a resonant frequency of the resonant circuit 420 may change depending on the on/off state of the switch 424. For example, the electronic device 101 may identify the on/off state of the switch 424 on the basis of a frequency of a signal from the electronic pen 201. For example, in case that the button of the electronic pen 201 is pressed/released, the switch 424 may be turned on/off, and the electronic device 101 may identify whether the button of the electronic pen 201 is pressed or not, on the basis of a frequency of a received signal that is identified through the digitizer.

At least one of the rectifiers 431 and 435 may rectify and output a signal (VPEN) of an alternating waveform output from the resonant circuit 420. A charge switch controller ($SW_{chg}$ ctrl) 432 may receive a rectified signal VM output from the rectifier 431. The charge switch controller 432, based on the rectified signal VM, may identify whether the signal generated by the resonant circuit 420 is a signal for charging or a signal for detecting a position. For example, the charge switch controller 432 may identify whether the signal generated by the resonant circuit 420 is for charging or for detecting a position, for example, based on magnitude of a voltage of the rectified signal VM. In addition, the charge switch controller 432 may identify, based on a waveform of the rectified signal (VM), whether a signal having a pattern for initiating charging is being input.

The charge switch controller 432 may turn a charge switch 436 on or off. The charge switch controller 432 may control a charging of the battery 437.

In an embodiment, the charge switch 436 may transmit a charging power received from the rectifier 435 to the battery 437 under the control of the charge switch controller 432.

The battery 437 may be charged using the rectified signal VIN received in case the charge switch 436 is on. An over-voltage protection circuit OVP 433 may identify a battery voltage VBAT, and may control the charge switch 436 to an off state when the battery voltage VBAT exceeds an over-voltage threshold.

In an embodiment, a load switch controller SWL ctrl 434 may measure a voltage value output by the battery 437.

The load switch controller SWL ctrl 434 may control a load switch SWL 438 to an on state when the battery voltage VBAT is identified as exceeding an operating voltage threshold. When the load switch 438 is turned on, power from the battery 437 may be transmitted to the BLE communication circuit and controller (BLE+controller) 439 (e.g., the communication circuit 290 and the processor 220 in FIG. 2). The load switch controller 434 may include an under voltage lock out (UVLO) circuit.

In an embodiment, the load switch 438 may provide a power required for the BLE communication circuit and the controller 439 to operate according to the control of the load switch controller 434. The load switch 438 may control the BLE communication circuit and a connection between the controller 439 and the battery 437.

The BLE communication circuit and the controller 439 may utilize the received power to operate. A button control circuit 440 may transmit information on an input of the button to the BLE communication circuit and the controller 439 in case a distance between the electronic pen 201 and the electronic device 101 is greater than a threshold distance. The BLE communication circuit and the controller 439 may transmit information on the received button input to the electronic device 101 via an antenna 441 (e.g., the antenna 297 in FIG. 2).

A sensor 450 (e.g., the sensor circuit 299 in FIG. 2) may include a gyro sensor 451 and/or an accelerometer 452. Sensing data obtained by the gyro sensor 451 and/or the accelerometer 452 may be transmitted to the BLE communication circuit and the controller 439.

The BLE communication circuit and the controller 439 may transmit a communication signal including the received sensing data to the electronic device 101 via the antenna 441. Alternatively, the BLE communication circuit and the controller 439 may identify information related to a position of the identified electronic pen 201 (e.g., coordinates and/or displacement of the electronic pen 201) based on the received sensing data. The BLE communication circuit and the controller 439 may transmit the information related to the position of the identified electronic pen 201 to the electronic device 101, via the antenna 441.

The BLE communication circuit and the controller 439 may activate the acceleration sensor 452 in case the electronic pen 201 is withdrawn or detached from the electronic device 101. The BLE communication circuit and the controller 439 may activate the gyro sensor 451 in case the button is pressed. Meanwhile, an activation time point is simply illustrative and there is no limitation on an activation time point per sensor. In addition, the sensor 450 may further include a geomagnetic sensor. In case that only the acceleration sensor 452 is activated, the electronic pen 201 may provide the electronic device 101 with acceleration information measured by the acceleration sensor 452, and the electronic device 101 may operate on the basis of position and acceleration information of the electronic pen 201 identified based on an electronic pen signal.

Figure 5:
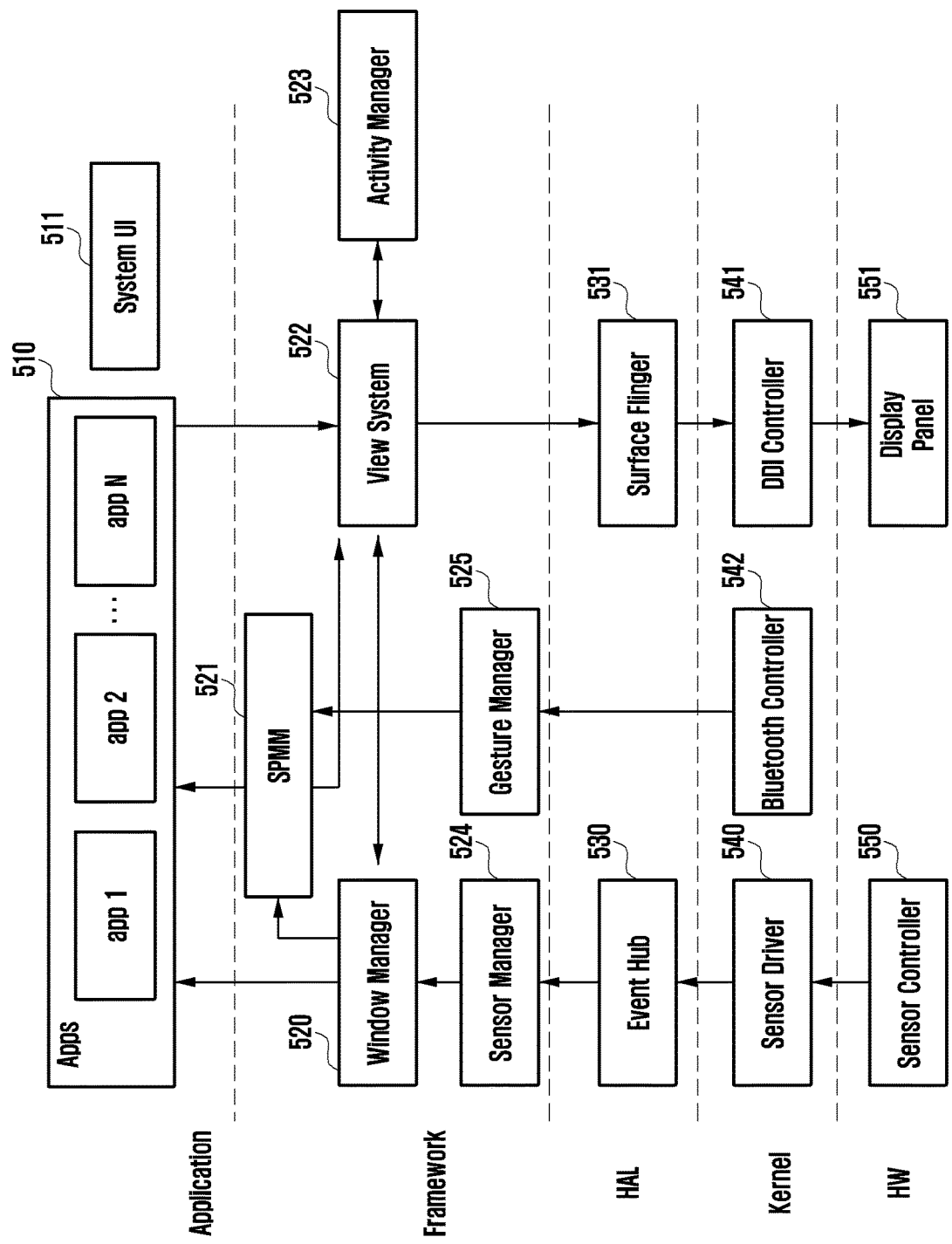
FIG. 5 illustrates a structure of the electronic pen platform of the electronic device according to various embodiments.

FIG. 5 illustrates a structure of the electronic pen platform of the electronic device according to various embodiments.

With reference to FIG. 5, an electronic device (e.g., the electronic device 101 in FIG. 1, FIG. 3, or FIG. 4) according to various embodiments may manage an operation of an electronic pen (e.g., the electronic pen 201 in FIGS. 2 and 4) based on an electronic pen framework. A constitution of the electronic device 101 illustrated in FIG. 5 may be implemented in software by being executed by a processor (e.g., the processor 120 in FIG. 1 or the processor 340 in FIG. 3) and loaded into a memory (e.g., the memory 130 in FIG. 1 or the memory 350 in FIG. 3). In an example, the constitution of the software-implemented electronic device 101 may be divided into an application layer, a framework layer, a hardware abstraction layer (HAL), a kernel driver layer, and/or a hardware (HW) layer.

The application layer may include applications 510 and a system user interface (system UI) 511. The applications 510 may include an application stored in memory of the electronic device 101 or executable or installed by the processor, for example, app1 app2, or appN, one of which may be an electronic pen app that provides interaction with a user to configure the electronic pen. The system user interface 511 may be a system of the electronic device 101, for example, an application that controls a display of a common region (fixed region/part) or a common function of a screen. For example, the system user interface 511 may manage the screen related to a notification bar, or a quick view.

The framework layer may include a window manager 520, a pen pointer movement manager (SPMM:stylus (e.g., an electronic pen) pointer movement manager) 521, a view system 522, an activity manager 523, a sensor manager 524, and/or a stylus gesture manager 525. The window manager 520 may manage one or more GUI resources used on the screen. For example, the window manager 520 may deliver information on a display area of the electronic device 101 to the applications 510.

In an embodiment, the window manager 520 may deliver to the application 510 information on the display area that corresponds to a changed state of the electronic device 101. The window manager 520 may identify changes in the state of the electronic device 101 via a sensor module (e.g., the sensor module 176 of FIG. 1). For example, in case a change in the state of the electronic device 101 is identified, the window manager 520 may deliver the display area information corresponding to the changed state of the electronic device 101 to an application 510 for which continuity is configured among the running applications 510.

In an embodiment, the pen pointer movement manager 521 is illustrated as being included in the framework layer, but may not be limited thereto. For example, the pen pointer movement manager 521 may be disposed between the application layer and the framework layer.

The pen pointer movement manager 521, under the control of the processor 120, may manage resources used for a theme of the electronic pen 201. The pen pointer movement manager 521 may perform overall management regarding the theme of the electronic pen 201, such as changing or updating a configuration of the user interface related to the electronic pen 201. For example, the pen pointer movement manager 521 may control a display and a change of position of the pen pointer of the electronic pen 201.

The pen pointer movement manager 521, under the control of the processor 120, may receive display information from a display (e.g., the display module 160 in FIG. 1 or the display 310 in FIG. 3) and electronic pen information from the electronic pen 201. The display information may include information on a refresh rate of the display (e.g., the display module 160 in FIG. 1 or the display 310 in FIG. 3). For example, the refresh rate of the display (e.g., the display module 160 in FIG. 1 or the display 310 in FIG. 3) may include 60 Hz or 120 Hz, and is not limited thereto.

The electronic pen information may be information on a transmission rate of the coordinates of the electronic pen 201. For example, the electronic pen information may include a transmission rate of 20 times per second, or a transmission rate of 30 times per second, and is not limited thereto. The pen pointer movement manager 521, under the control of the processor 120, may determine an operation of the pen pointer on the basis of the display information and the electronic pen information. The pen pointer movement manager 521 may control the display (e.g., the display module 160 in FIG. 1 or the display 310 in FIG. 3) on the basis of the determined pen pointer operation. For example, the pen pointer movement manager 521 may control a time point when the pen pointer is displayed on the display (e.g., the display module 160 in FIG. 1 or the display 310 in FIG. 3) on the basis of the determined pen pointer operation. The pen pointer movement manager 521 may calculate intermediate coordinates and/or delayed coordinates of the pen pointer on the display (e.g., the display module 160 in FIG. 1 or the display 310 in FIG. 3) on the basis of the determined pen pointer operation, and may control to display the calculated intermediate coordinates and/or delayed coordinates on the display (e.g., the display module 160 in FIG. 1 or the display 310 in FIG. 3).

In an embodiment, the pen pointer movement manager 521 may manage a coordinates system that includes coordinates information of the pen pointer according to a movement of the pen pointer on the display.

In an embodiment, a view system 522 may be a program for drawing layers based on a resolution of the display 160.

The application 510 may utilize the view system 522 to draw layers based on the resolution of the display 160.

The view system 522 may include a set of expandable views used to generate a user interface of the application 510. The activity manager 523 may control a lifecycle and an activity stack of the application 510. The sensor manager 524 may control sensor information included in the sensor module 176. The pen gesture manager 525 may identify a gesture corresponding to motion information, based on the motion information of the electronic pen 201 obtained via a bluetooth controller 542, and transmit information on the gesture to the pen pointer movement manager 521.

The hardware abstraction layer (HAL) is an abstracted layer between a plurality of hardware modules included in the hardware layer and a software of the electronic device 101, which may include an event hub 530, and a surface flinger 531. The event hub 530 may be a standardized interface for events occurring in the touch circuit and sensor circuit. The surface flinger 531 may synthesize a plurality of layers and provide data representing a synthesized plurality of objects to a display controller. Here, the display controller may mean a graphic display controller.

The kernel layer may include various drivers for controlling various hardware modules included in the electronic device 101. For example, the kernel layer may include a sensor driver 540 to control a sensor controller connected to a sensor, a display controller 541 to control a display panel, and a bluetooth controller 542 to control Bluetooth, but is not limited thereto. The hardware layer may include hardware modules or constituents included in the electronic device 101, such as a sensor controller 550, and a display panel 551, and may include at least some of the constituents illustrated in FIG. 1.

In an embodiment, the hardware layer may identify a change in state of the electronic device 101 on the basis of the sensor module 176. The sensor controller 550 may control the sensor module 176. The display panel 551 may utilize the touch sensor to sense touch input from a user.

Figure 6:
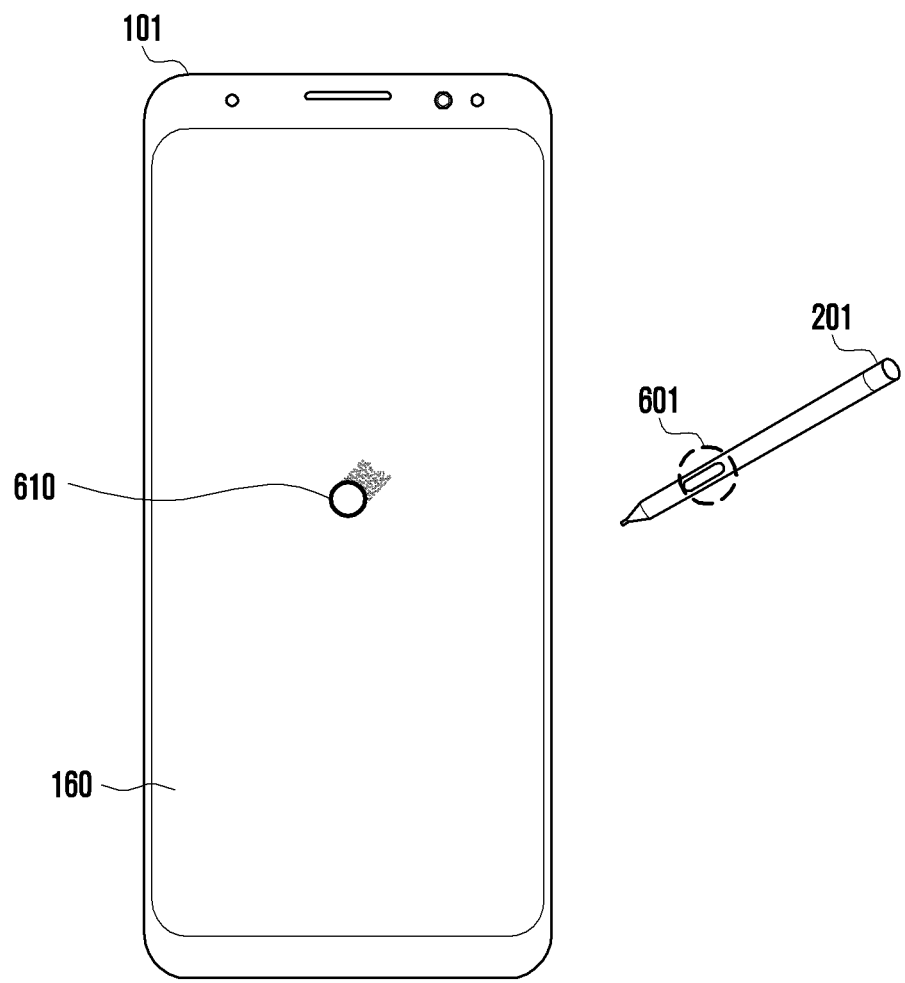
FIG. 6 is a view illustrating the electronic device and the electronic pen according to various embodiments of the present disclosure.

FIG. 6 is a view illustrating the electronic device 101 and the electronic pen 201 according to various embodiments of the present disclosure.

The electronic device 101 may accommodate and/or attach the electronic pen 201 to an accommodation space (e.g., a non-challenging area) inside and/or outside a housing of the electronic device 101. The electronic device 101 may further include a magnet (not illustrated) and a coil (e.g., 411 and 412 in FIG. 4). The electronic device 101 may sense a state of detachment and/or attachment of the electronic pen 201 by means of the magnet (not illustrated) and the coil (e.g., 411 and 412 in FIG. 4).

When the electronic pen 201 is detached from and/or attached to the electronic device 101, the electronic device 101 may detect the state of detachment and/or attachment of the electronic pen 201 by identifying a change in a matching state between the coils (e.g., 411 and 412 in FIG. 4) and a coil (e.g., 421 in FIG. 4) included in the electronic pen 201.

In various embodiments, when the electronic pen 201 is detached from and/or attached to the electronic device 101, the electronic device 101 may detect the state of detachment and/or attachment of the electronic pen 201 by identifying a change in current and/or voltage due to a change in magnetic field between the magnet (not illustrated) included in the electronic device 101 and a magnet (not illustrated) included in the electronic pen 201.

The electronic pen 201 may include a communication button 601 on at least a portion of the electronic pen 201. The communication button 601 may be, for example, an EMR button and/or a BLE button. The communication button 601 may be implemented in any one of a physical key, a touch key, a motion key, a pressure key, or a key less, and the form of implementation is not limited. When a user input (e.g., touch and/or press) is provided by the communication button 601, the electronic pen 201 may communicate (e.g., EMR communication and/or BLE communication) with the electronic device 101.

In various embodiments, when a user input (e.g., touch and/or press) is provided by the communication button 601, the electronic pen 201 may transmit the motion information to the electronic device 101 via the communication circuit 290 at predetermined intervals (e.g., 20 times per second). The motion information of the electronic pen 201 may be, for example, position information, and movement information.

When receiving the motion information from the electronic pen 201, the electronic device 101 may calculate coordinates on the display module 160 corresponding to the motion information under the control of the processor 120, and display a pen pointer 610 at a position on the display module 160 corresponding to the calculated coordinates. The pen pointer 610 is a GUI element that may be displayed on the display module 160 under the control of the pen pointer movement manager 521 in FIG. 5.

Figure 7:
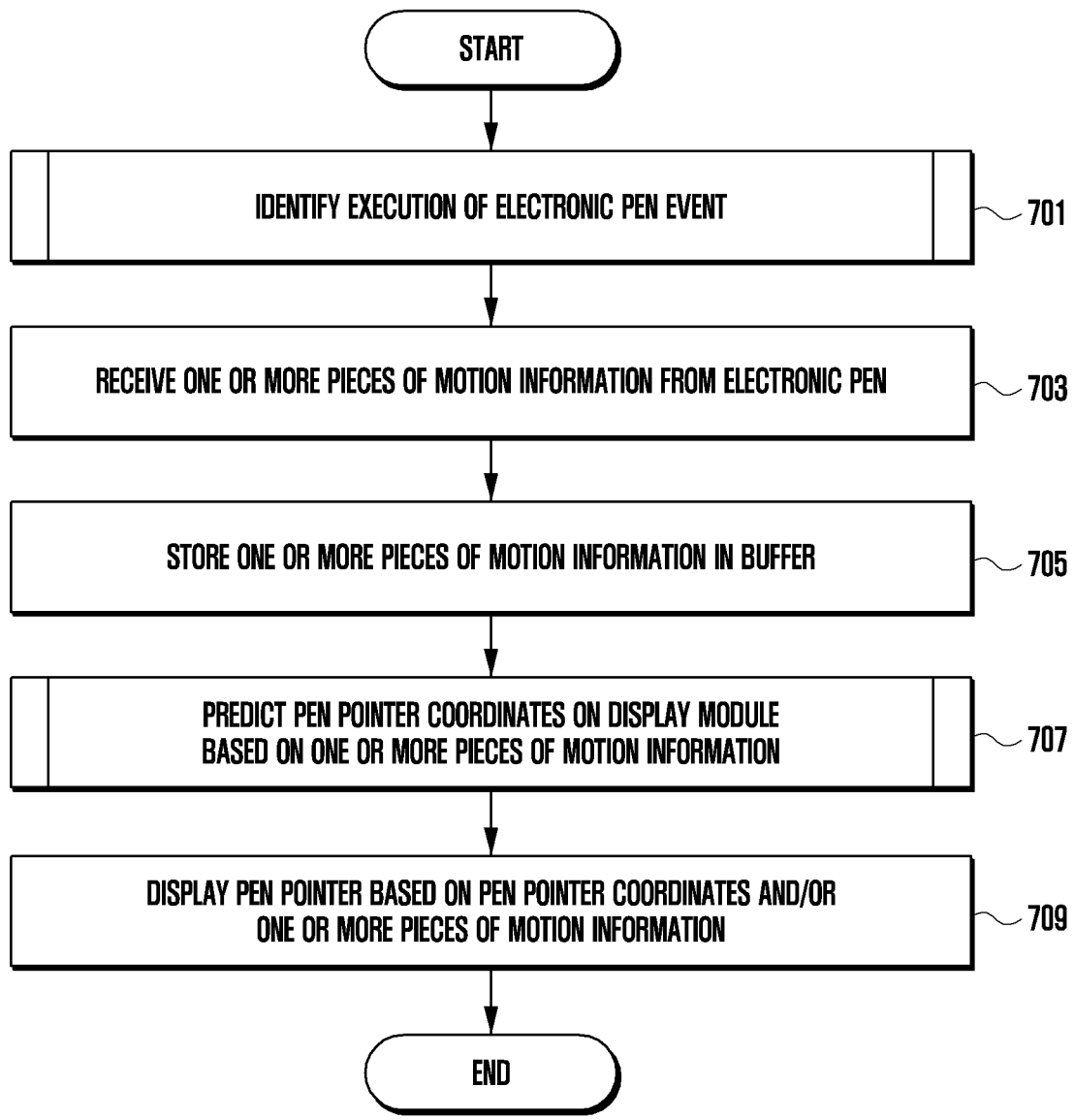
FIG. 7 is a flowchart illustrating a method for displaying a pen pointer in the electronic device according to various embodiments of the present disclosure.

FIG. 7 is a flowchart illustrating a method for displaying a pen pointer in the electronic device 101 according to various embodiments of the present disclosure.

The electronic device 101 may identify an execution of the electronic pen 201 event, at operation 701, under the control of the processor 120.

The electronic device 101 may determine that the electronic pen event associated with an electronic pen 201 is being executed, at operation 701, under the control of the processor 120.

The electronic device 101 according to an embodiment may, under the control of the processor 120, establish a wireless communication connection between the electronic device 101 and the electronic pen 201. The electronic device 101 and the electronic pen 201 may execute a connection operation. When the electronic pen 201 is inserted into the electronic device 101, the connection operation may be executed. With the electronic device 101 and the electronic pen 201 connected, the electronic device 101 may identify the execution of the electronic pen 201 event.

An operation to execute the electronic pen 201 event relates to an interaction operation between the electronic pen 201 and the electronic device 101, which may be an operation to execute an air pointer (e.g., air command, air gesture) function of the electronic pen 201.

When the electronic pen 201 event execution is identified, the electronic device 101, under the control of the processor 120, may, based on the motion information received via the electronic pen 201, execute functions and/or commands corresponding to the motion information and/or display the pen pointer 610 corresponding to the motion information on the display module 160.

The electronic device 101, under the control of the processor 120, may receive one or more pieces of motion information from the electronic pen 201 at operation 703.

The electronic pen 201 may transmit sensing data (e.g., motion information) obtained by the gyro sensor 451 and/or the accelerometer 452 to the electronic device 101 via the communication circuit 290. When a user input (e.g., touch and/or press) is provided by the communication button 601, the electronic pen 201 may transmit the motion information to the electronic device 101 via the communication circuit 290 at predetermined intervals (e.g., 20 times per second).

The electronic device 101 may receive the motion information transmitted via the communication circuit 290 of the electronic pen 201 via the communication module 190 under the control of the processor 120.

The motion information is information on the position and/or movement of the electronic pen 201, which may be coordinates information on the electronic pen 201 in a space (x-y-z) and/or coordinates information on the electronic pen 201 in a plane (x-y).

The electronic device 101, under the control of the processor 120, may, at operation 705, store one or more pieces of motion information in a buffer. An operation of storing in the buffer may be, for example, an operation of buffering one or more pieces of motion information in software. The operation of storing in the buffer may be an operation of storing or recording one or more pieces of motion information for a period of time (or a predetermined time), for example, using the memory 130 of the electronic device 101.

According to various embodiments, the electronic pen 201 may transmit the motion information of the electronic pen 201 to the electronic device 101 at predetermined time slices. In this case, since the electronic pen 201 and the electronic device 101 transmit and receive the motion information via wireless communication (e.g., BLE communication and/or EMR communication), it may occur that the motion information is not transmitted at predetermined time slices due to noise. In this case, in general, the electronic pen 201 may simultaneously transmit previously untransmitted motion information when a communication delay is resolved. Further, the electronic device 101 may simultaneously receive previously untransmitted motion information when the communication delay is resolved. The electronic device 101 may smoothly display the pen pointer 610 on the display module 160 by predicting the coordinates of the pen pointer 610 by storing one or more pieces of motion information in the buffer, even when there is a communication delay for the motion information.

The electronic device 101, under the control of the processor 120, may, at operation 707, predict the coordinates of the pen pointer 610 on the display module 160 on the basis of one or more pieces of motion information.

The electronic device 101, under the control of the processor 120, may, at operation 707, determine the coordinates of the pen pointer 610 on the display module 160 on the basis of one or more pieces of motion information.

The electronic device 101 may identify display information from the display module 160 and receive electronic pen information from the electronic pen 201.

The display information may include hardware information on the display module 160 and/or information regarding a refresh rate of the display module 160. The display module 160 may have a refresh rate of, for example, 60 Hz, or 120 Hz, and is not limited thereto.

The display module 160 may have hardware information of, for example, FHD, WHD, or QHD, and is not limited thereto.

The electronic pen information may include information on a transmission rate of the coordinates of the electronic pen 201. For example, the electronic pen information may include a transmission rate of 20 times per second, or a transmission rate of 30 times per second, and is not limited thereto.

For example, assuming that the display module 160 may refresh the screen 60 times per second, and the electronic pen 201 may transmit movement information 20 times per second, it will be described as follows It may be unnatural for the electronic device 101 to display the pen pointer 610 only 20 times per second to indicate that the display module 160 has received the motion information from the electronic pen 201 20 times per second, even though the display module 160 is refreshing the screen 60 times per second.

In various embodiments, the electronic device 101, under the control of the processor 120, may determine the pen pointer 610 operation based on the display information and the electronic pen information, at operation 707.

The electronic device 101, according to various embodiments of the present disclosure, may buffer the motion information of the electronic pen 201, and predict the coordinates of the pen pointer 610 between the received motion information every period of time based on the buffered motion information and display the coordinates of the pen pointer 610 on the display module 160. The coordinates of the pen pointer 610 between the received motion information may be predicted and displayed for each screen refresh cycle of the display module 160 to provide a natural and smooth pen pointer 610 movement to the user.

The electronic device 101, under the control of the processor 120, may determine, based on the electronic pen information and the display information, an operational method of the pen pointer 610 to display for each screen refresh cycle of the display module 160. An operation of the electronic device 101, under the control of the processor 120, determining, based on the electronic pen information and the display information, the operational method of the pen pointer 610 to be displayed for each screen refresh cycle of the display module 160 may be to determine the number of cycles and/or times the display module 160 needs to predict and display the coordinates of the pen pointer 610 while not receiving the motion information of the electronic pen 201. The electronic device 101 may predict an intermediate coordinate on the basis of a direction and speed of movement of the pen pointer coordinates based on the motion information of the electronic pen 201.

The electronic device 101, under the control of the processor 120, may control the display module 160 on the basis of the determined pen pointer operation. The electronic device 101 may control the display module 160 by means of the processor 120 to delay time to display the pen pointer 610 on the display module 160 after receiving the motion information.

The electronic device 101, under the control of the processor 120, may predict coordinates of the display module 160 of the pen pointer 610 on the basis of the motion information transmitted based on the determined pen pointer operation and display the coordinates on the display module 160.

In various embodiments, the electronic device 101, under the control of the processor 120, may predict the coordinates (delayed coordinates) of the display module 160 of the pen pointer 610 on the basis of the delayed transmitted motion information based on the determined pen pointer operation and display the coordinates on the display module 160.

The electronic device 101, under the control of the processor 120, may, at operation 709, display the pen pointer 610 on the display module 160 on the basis of the predicted pen pointer coordinates and/or one or more pieces of motion information.

The electronic device 101, under the control of the processor 120, may, at operation 709, display the pen pointer 610 on the display module 160 on based on the determined pen pointer coordinates and/or one or more pieces of motion information.

Figure 8:
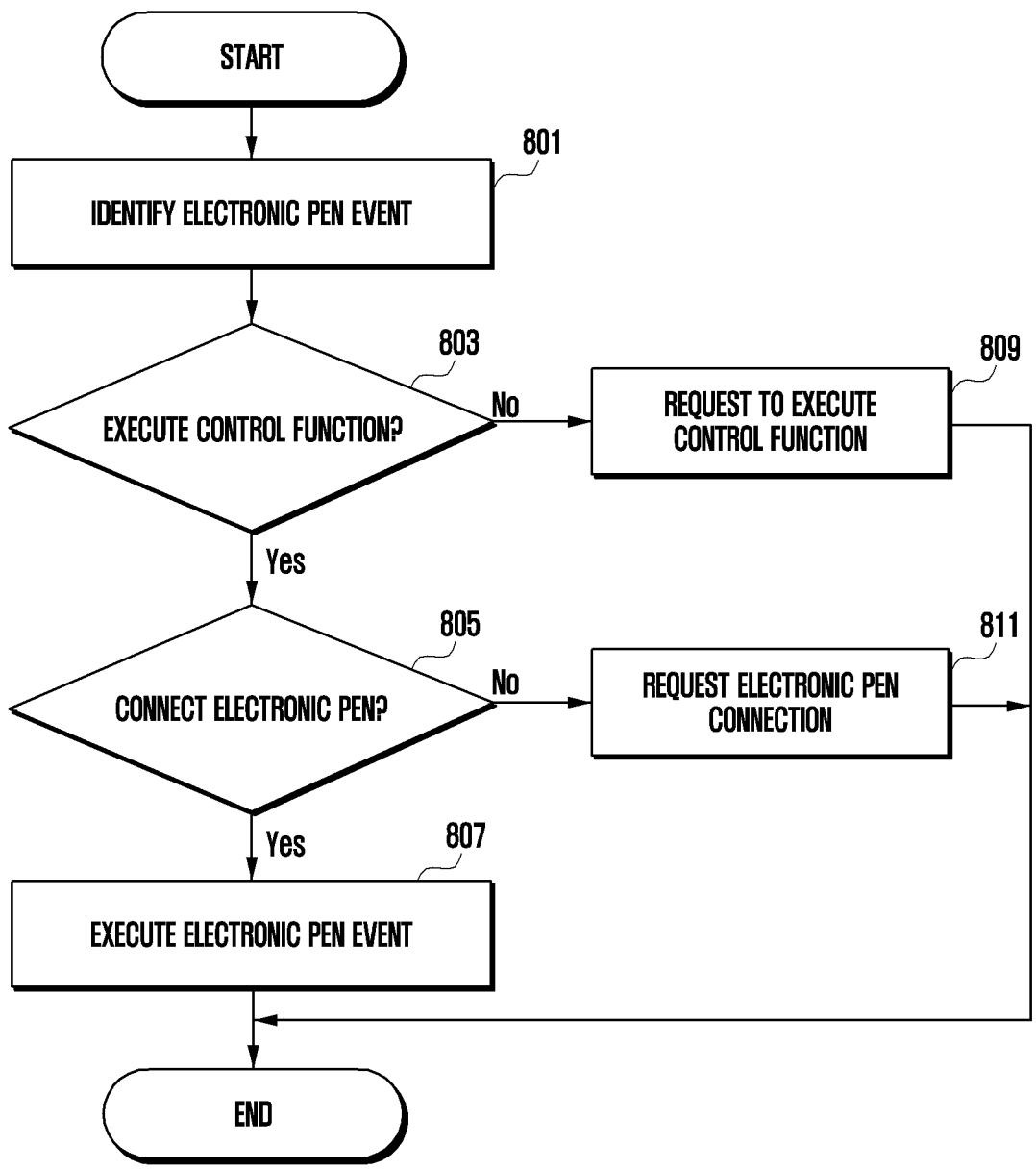
FIG. 8 is a flowchart illustrating an operation to identify an execution of an electronic pen event in FIG. 7.

FIG. 8 is a flowchart illustrating an operation to identify an execution of an electronic pen event in FIG. 7.

The electronic device 101, under the control of the processor 120, may identify the electronic pen event at operation 801.

In an embodiment, the electronic device 101 may identify that the electronic pen event occurs when receiving a user input (e.g., touch and/or press) from the communicatively connected electronic pen 201 via the communication button 601 of the electronic pen 201.

The electronic pen event may be an air pointer function execution event. The air pointer function may be a function that identifies spatial motion information of the electronic pen 201 to interact with the electronic device 101. The electronic device 101, under the control of the processor 120, may, at operation 803, identify whether to execute a control function.

The electronic device 101, under the control of the processor 120, may branch from operation 803 to operation 805 when the control function is executed.

The electronic device 101, under the control of the processor 120, may branch from operation 803 to operation 809 when no control function is executed.

The control function execution may be to control an application installed on the electronic device 101 or to configure the application to control a function of the electronic device 101 using the electronic pen 201. For example, the control function may include executing the application, or controlling the operation of the application (e.g., shooting a camera).

The electronic device 101, under the control of the processor 120, may, at operation 805, identify whether the electronic pen 201 is connected.

In various embodiments, electronic device 101, under the control of processor 120, may identify, at operation 805, whether the electronic pen 201 is in communication with electronic device 101 via a communication network (e.g., EMR communication and/or BLE communication).

The electronic device 101, under the control of the processor 120, may branch from operation 805 to operation 807 when the electronic pen 201 is connected.

The electronic device 101, under the control of the processor 120, may branch from operation 805 to operation 811 when the electronic pen 201 is not connected.

The electronic device 101, under the control of the processor 120, may execute the electronic pen event at operation 807. The electronic device 101 may execute an air pointer function execution event. The electronic device 101 may receive the motion information of the electronic pen 201 via the communication module 190 at predetermined intervals (e.g., 20 times per second) from the communicatively connected electronic pen 201. The motion information of the electronic pen 201 may be, for example, position information, and movement information.

When receiving the motion information from the electronic pen 201, the electronic device 101 may calculate coordinates on the display module 160 corresponding to the motion information under the control of the processor 120, and execute the air point function to display the pen pointer 610 at a position on the display module 160 corresponding to the calculated coordinates.

The electronic device 101, under the control of the processor 120, may request execution of the control function, at operation 809.

In various embodiments, the electronic device 101, under the control of the processor 120, may, at operation 809, display information on the execution of the control function on the display module 160 and request the user to execute the control function.

In various embodiments, the electronic device 101, under the control of the processor 120, may automatically request the electronic pen application to execute the control function, at operation 809.

The electronic device 101, under the control of the processor 120, may request connection to the electronic pen 201 at operation 811.

In various embodiments, the electronic device 101, under the control of the processor 120, may, at operation 811, display information on the connection of the electronic pen 201 on the display module 160 and request the user to establish a communication connection with the electronic pen 201.

In various embodiments, when the user stores the electronic pen 201 in the housing in which the electronic pen 201 of the electronic device 101 may be stored, the electronic device 101 and the electronic pen 201 may perform a communication connection.

In various embodiments, the electronic device 101, under the control of the processor 120, may, at operation 811, automatically request the electronic pen application to connect with the electronic pen 201 and perform the communication connection with the electronic pen 201.

Figure 9:
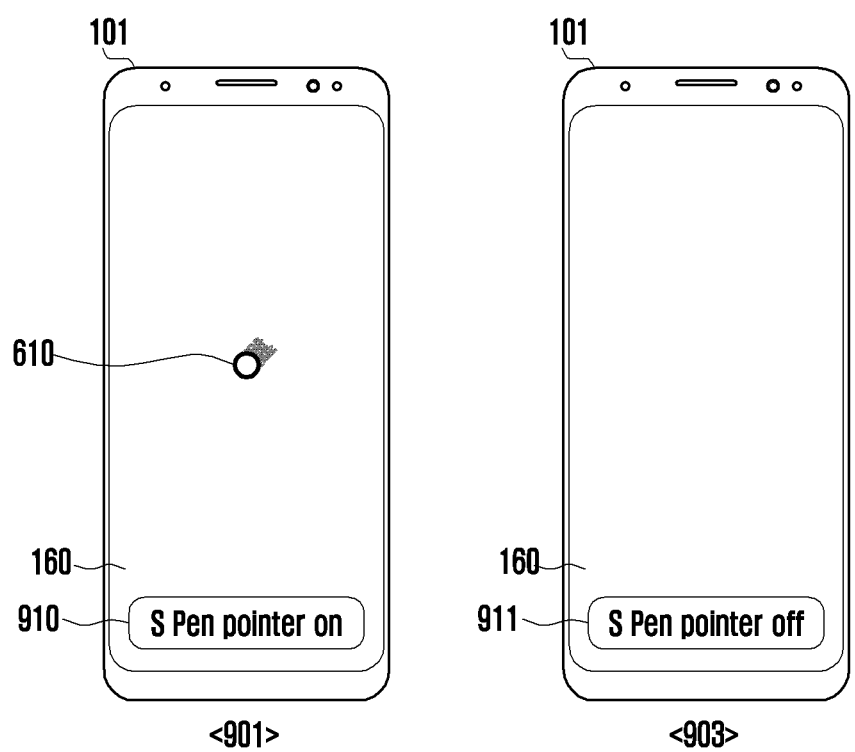
FIG. 9 is a view illustrating an electronic pen event execution screen and an ending screen of the electronic device according to various embodiments of the present disclosure.

FIG. 9 is a view illustrating an electronic pen event execution screen and an ending screen of the electronic device 101 according to various embodiments of the present disclosure.

At reference number 901, the electronic device 101 may display the pen pointer 610 on the display module 160 when the electronic pen event is executed, and may move and display the coordinates of the pen pointer 610 on the display module 160 in response to the movement of the electronic pen 201. When the electronic device 101 may display the pen pointer 610 on the display module 160 when the electronic pen event is executed, and may display a notification 910 on the display module 160 temporarily indicating that the electronic pen event has been executed.

At reference number 903, the electronic device 101 may not further display the pen pointer 610 on the display module 160 when the electronic pen event ends, and may temporarily display a notification 911 on the display module 160 indicating that the electronic pen event has ended.

In an embodiment, the electronic device 101, under the control of the processor 120, may end execution of the air pointer when receiving a designated movement (or, gesture) and/or button input from the electronic pen 201. For example, the electronic device 101 may end execution of the air pointer when receiving information on a button release from the electronic pen 201.

Figure 10:
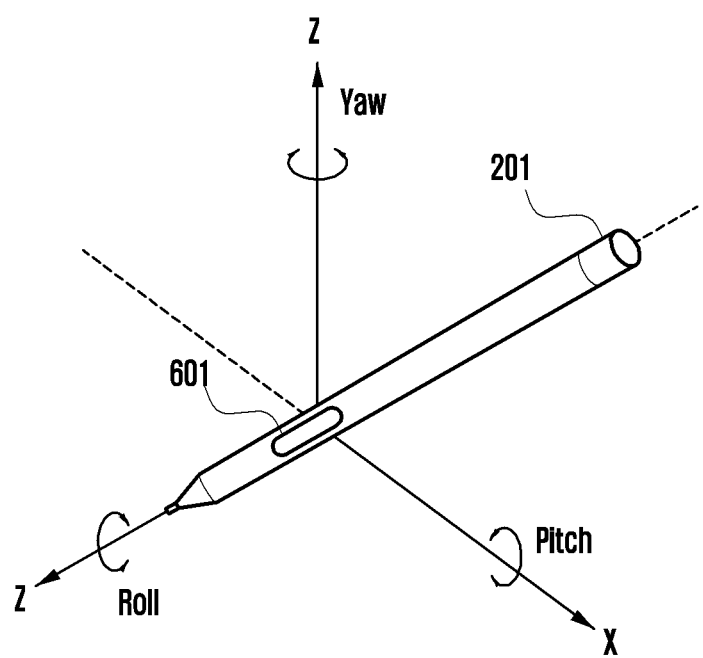
FIG. 10 is a diagram illustrating a method for obtaining motion information on the electronic pen according to various embodiments of the present disclosure.
Figure 11:
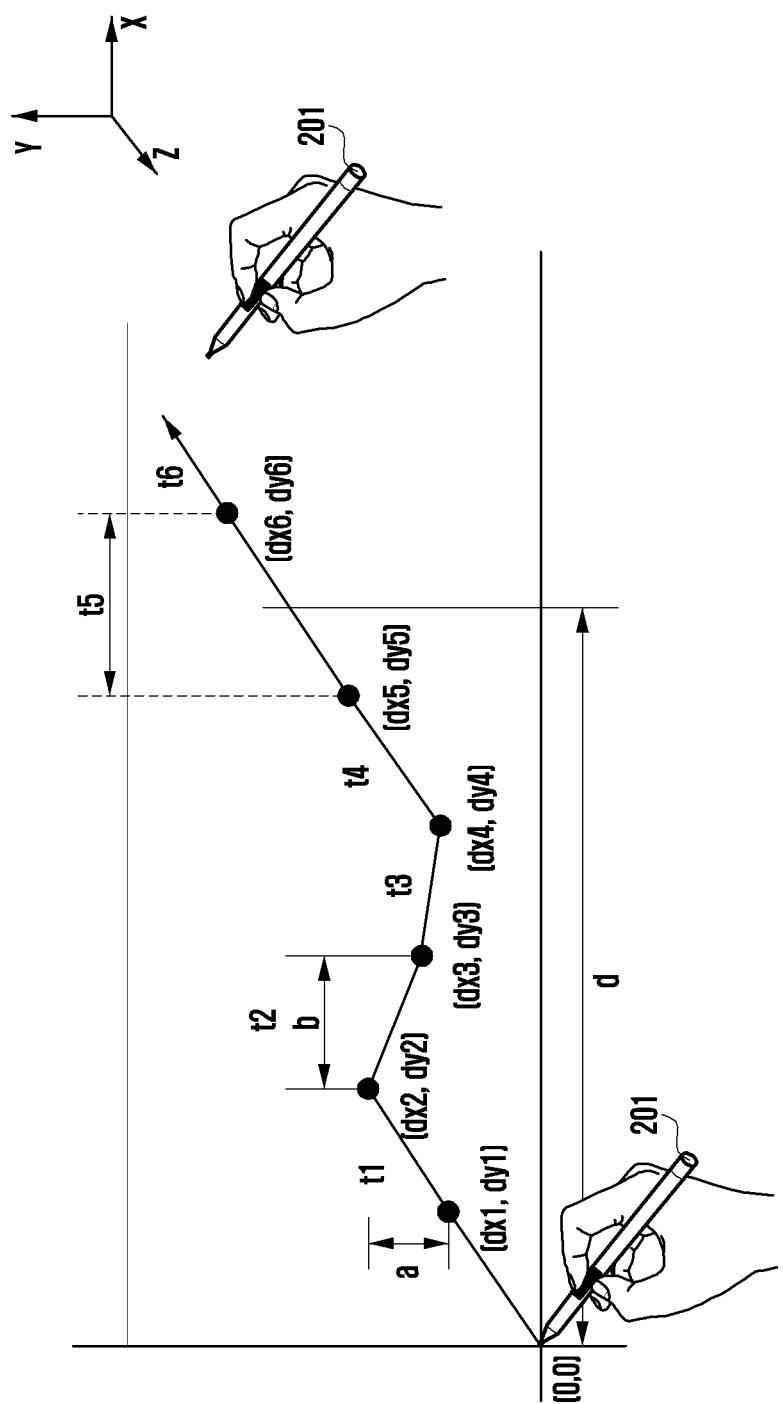
FIG. 11 is a view illustrating the motion information on the electronic pen on a coordinates plane according to various embodiments of the present disclosure.

FIG. 10 is a diagram illustrating a method for obtaining motion information on the electronic pen 201 according to various embodiments of the present disclosure. FIG. 11 is a view illustrating the motion information on the electronic pen 201 on a coordinates plane according to various embodiments of the present disclosure.

With reference to FIGS. 10 and 11, the electronic pen 201 may include a communication button 601. The electronic pen 201 may obtain sensing data (e.g., motion information) by the gyro sensor 451 and/or the accelerometer 452 relative to the communication button 601, and transmit the obtained motion information to the electronic device 101 via the communication circuit 290. The electronic pen 201 may transmit three-axis (x-y-z) coordinates information relative to the communication button 601, as well as yaw, roll, and pitch information, which is rotation information for each axis, to the electronic device 101 as the motion information.

In an embodiment, the electronic pen 201 may transmit a communication signal that includes information on pressing of the button on the electronic pen to the electronic device 101 when identifying the pressing of the communication button 601. The electronic pen 201 is assumed to have already formed a communication connection with the electronic device 101. The electronic device 101 may receive the motion information of the electronic pen 201 at predetermined time slices (e.g., t1, t2, t3, t4, and t5) on the basis of information on the received pressing of the button of the electronic pen. The electronic pen 201 may identify information on the displacement of the electronic pen 201, for example, on the basis of information sensed from the gyro sensor 451 and the accelerometer 452. The electronic pen 201 may identify a displacement in a two-dimensional (or three-dimensional) coordinate system on the basis of sensing information measured over a unit of time. The electronic pen 201 may transmit a first displacement (dx1 and dy1), a second displacement (dx2 and dy2), a third displacement (dx3 and dy3), a fourth displacement (dx4 and dy4), a fifth displacement (dx5 and dy5), and a sixth displacement (dx6 and dy6) at predetermined time slices (e.g., t1, t2, t3, t4, and t5). The electronic device 101 may identify time series positions within the coordinates system of the electronic pen 201 on the basis of the received displacements. For example, the electronic device 101 may identify a second position by applying (e.g., adding) the first displacement with respect to a first position in the coordinates system. The electronic device 101 may identify positions within a plurality of coordinate systems by sequentially applying displacements. The electronic device 101 may move and display coordinates on the display module 160 of the pen pointer 610 on the basis of positions within a plurality of coordinate systems of the identified electronic pens 201. In an embodiment, it is illustrated that the electronic pen 201 transmits information including displacement, but this is merely illustrative, the electronic pen 201 may transmit sensing information to the electronic device 101 as it is, or may transmit position information (e.g., coordinate values) to the electronic device 101.

Figure 12:
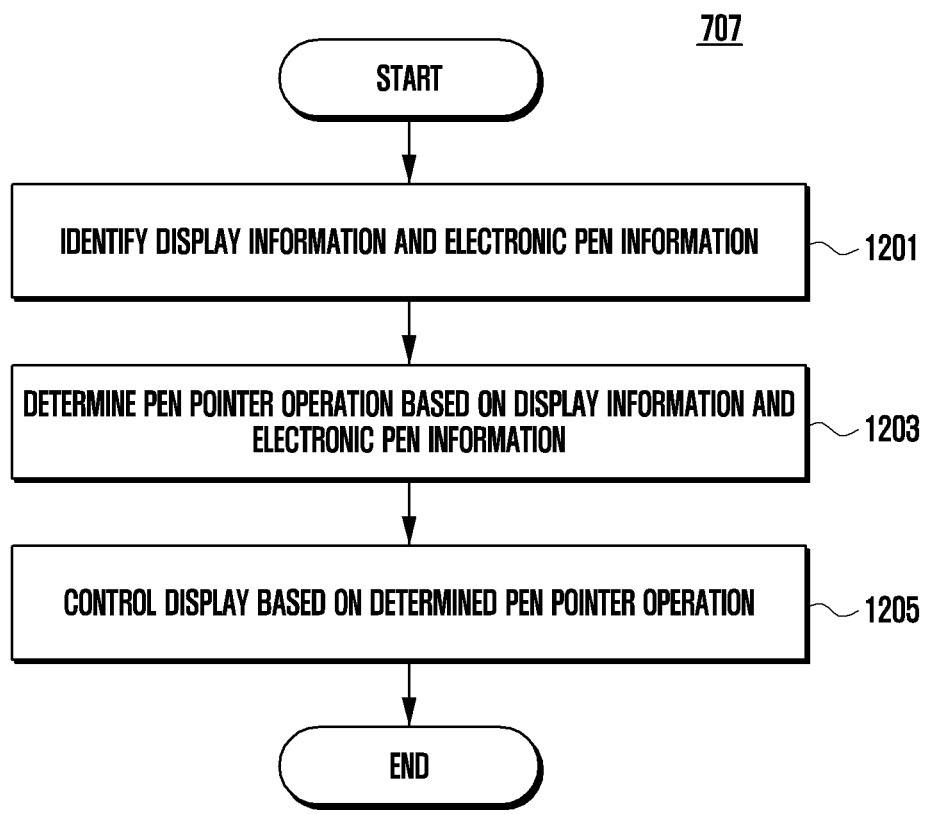
FIG. 12 is a flowchart illustrating an operation to predict pen pointer coordinates on a display module on the basis of one or more pieces of motion information in FIG. 7.

FIG. 12 is a flowchart illustrating an operation to predict the pen pointer 610 coordinates on the display module 160 on the basis of one or more pieces of motion information in FIG. 7.

The electronic device 101, under the control of the processor 120, may identify the display information and the electronic pen information at operation 1201.

According to various embodiments, the electronic device 101 may, under the control of the processor 120, at operation 1201, identify display information from the display module 160 and receive electronic pen information from the electronic pen 201.

In various embodiments, the electronic device 101, under the control of the processor 120, may determine the pen pointer 610 operation based on the display information and the electronic pen information, at operation 1203.

The electronic device 101, according to various embodiments of the present disclosure, may buffer the motion information of the electronic pen 201, and predict the coordinates of the pen pointer 610 between the received motion information every period of time based on the buffered motion information and display the coordinates of the pen pointer 610 on the display module 160.

According to various embodiments, the electronic device 101, under the control of the processor 120, at operation 1203, may determine, based on the electronic pen information and the display information, an operational method of the pen pointer 610 to display for each screen refresh cycle of the display module 160.

The electronic device 101, under the control of the processor 120, at operation 1205, may control the display module 160 on the basis of the determined pen pointer operation. The electronic device 101 may control the display module 160 by means of the processor 120 to delay time to display the pen pointer 610 on the display module 160 after receiving the motion information.

According to various embodiments, the electronic device 101, under the control of the processor 120, at operation 1205, may predict the coordinates of the display module 160 of the pen pointer 610 on the basis of the delayed transmitted motion information based on the determined pen pointer operation and display the coordinates on the display module 160.

According to various embodiments, the electronic device 101, under the control of the processor 120, at operation 1205, may determine the coordinates of the display module 160 of the pen pointer 610 on the basis of the delayed transmitted motion information based on the determined pen pointer operation and display the coordinates on the display module 160.

Figure 13:
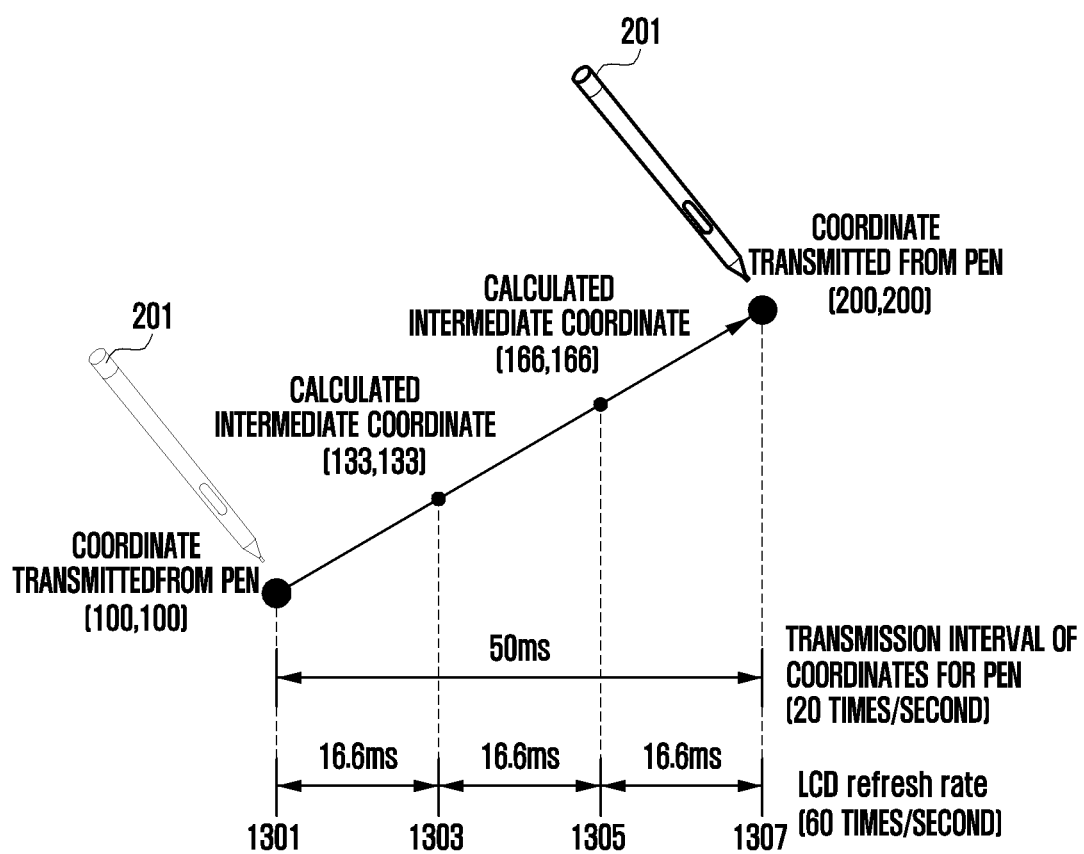
FIG. 13 is a view illustrating a method in which the electronic device, according to various embodiments of the present disclosure, predicts the pen pointer coordinates.

FIG. 13 is a view illustrating a method in which the electronic device 101, according to various embodiments of the present disclosure, predicts the coordinates of the pen pointer 610.

The electronic device 101 may identify display information from the display module 160 and receive electronic pen information from the electronic pen 201.

The display information may be hardware information on the display module 160 and/or information regarding a refresh rate of the display module 160. The display module 160 may have a refresh rate of, for example, 60 Hz.

The electronic pen information may be information on a transmission rate of the coordinates of the electronic pen 201. For example, the electronic pen information may have a transmission rate of 20 times per second.

In FIG. 13, when the electronic pen 201 has a coordinates transmission rate of 20 times per second, the electronic pen 201 may transmit the motion information to the electronic device 101 once every 50 ms. In this case, the display module 160 may refresh the screen every 16.6 ms because the display module 160 has a screen refresh rate of 60 Hz. In this case, when the electronic pen 201 transmits the motion information to the electronic device 101 once every 50 ms, the display module 160 refreshes four times of screen, so that it may be determined that a prediction of two times of the pen pointer coordinates for which no motion information is received is required. The electronic device 101 may determine the pen pointer 610 operation as requiring a prediction of two times of the pen pointer coordinates for which no motion information has been received on the basis of the display information and the electronic pen information.

When the electronic pen 201 has moved from a first coordinate (100, 100) to a second coordinate (200, 200) for 50 ms according to the coordinates transmission rate, the electronic device 101 may display a first pen pointer coordinate 1301 and a fourth pen pointer coordinate 1307 on the display module 160. However, while the electronic device 101 displays the first pen pointer coordinate 1301 and the fourth pen pointer coordinate 1307 on the display module 160, the electronic device 101 does not receive the motion information of the electronic pen 201 and may predict and display a second pen pointer coordinate 1303 and a third pen pointer coordinate 1305 on the basis of the second coordinate (200, 200) from the first coordinate (100, 100). In this case, the electronic device 101 need to get the second coordinate (200, 200) in advance to predict and display the second pen pointer coordinate 1303 and the third pen pointer coordinate 1305. In various embodiments of the present disclosure, after receiving the motion information, the electronic device 101 may delay time to display the pen pointer 610 on the display module 160, and display the second pen pointer coordinate 1303 and the third pen pointer coordinate 1305 by predicting the second coordinate (200, 200) using the coordinate at a time point when the first coordinate (100, 100) were transmitted and/or at a previous time point. while the electronic device 101 displays the first pen pointer coordinate 1301 and the fourth pen pointer coordinate 1307 on the display module 160, the electronic device 101 does not receive the motion information of the electronic pen 201 and may determine and display a second pen pointer coordinate 1303 and a third pen pointer coordinate 1305 on the basis of the second coordinate (200, 200) from the first coordinate (100, 100). In this case, the electronic device 101 need to get the second coordinate (200, 200) in advance to determine and display the second pen pointer coordinate 1303 and the third pen pointer coordinate 1305. In various embodiments of the present disclosure, after receiving the motion information, the electronic device 101 may delay time to display the pen pointer 610 on the display module 160, and display the second pen pointer coordinate 1303 and the third pen pointer coordinate 1305 by determining the second coordinate (200, 200) using the coordinate at a time point when the first coordinate (100, 100) were transmitted and/or at a previous time point.

Figure 14:
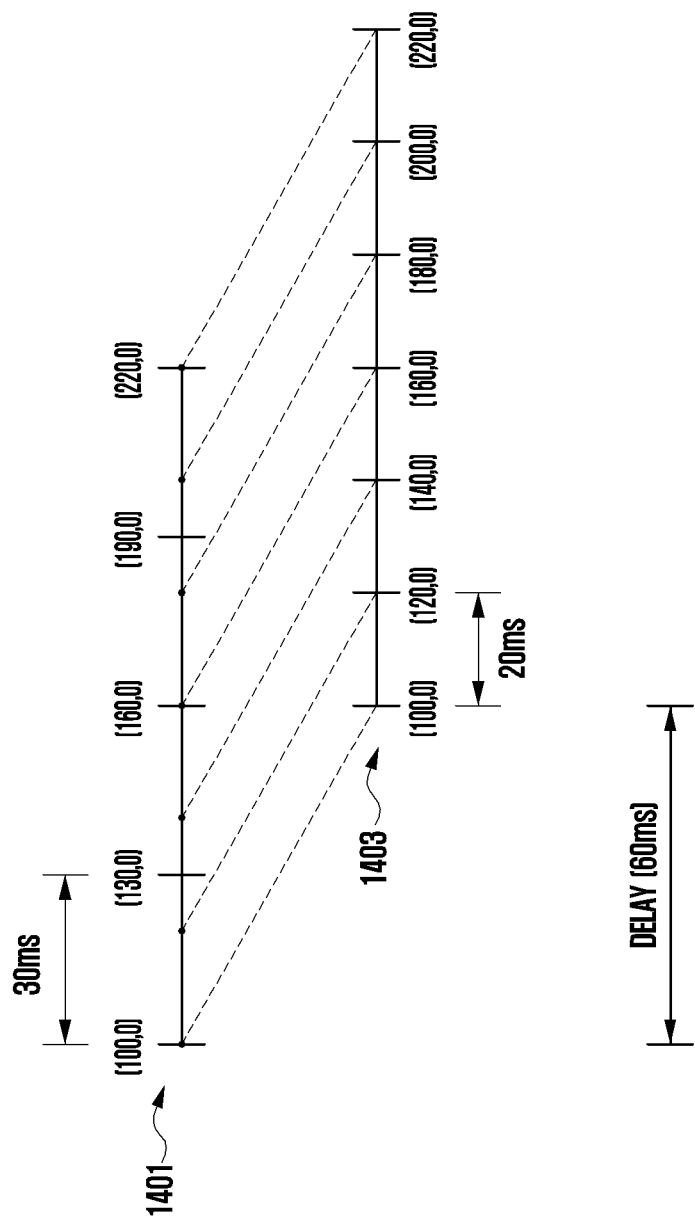
FIG. 14 is a view in which the electronic device, according to various embodiments of the present disclosure, shows time lines of the motion information transmitted from the electronic pen and the pen pointer displayed by the display module.

FIG. 14 is a view in which the electronic device 101, according to various embodiments of the present disclosure, shows time lines of the motion information transmitted from the electronic pen 201 and the pen pointer 610 displayed by the display module 160.

In FIG. 14, a first time line 1401 may represent an operation in which the electronic pen 201 transmits the motion information to the electronic device 101 once per a first time (e.g., 30 ms) when the electronic pen 201 has a coordinates transmission rate of 33 times per second.

A second time line 1403 may represent an operation in which the screen is refreshed every a second time (e.g., 20 ms) because the display module 160 has a screen refresh rate of 50 Hz.

The electronic device 101 may display the pen pointer 610 by delaying time to display the pen pointer 610 on the display module 160 after receiving the motion information. For example, the second time line 1403 may be delayed from the first time line 1401 by a predetermined time (approximately 60 ms). The electronic device 101 may receive the motion information from the electronic pen 201 and delay 60 ms to display the pen pointer 610 on the display module 160. The delay time is disclosed as 60 ms, but is not limited thereto.

In FIG. 14, when the electronic pen 201 transmits the motion information two times to the electronic device 101 at a time when the first time has elapsed two times (e.g., 60 ms), the display module 160 refreshes three times of screen, so that it may be determined that a prediction of two times of the pen pointer coordinates for which no motion information is received is required. The electronic device 101 may determine the pen pointer 610 operation as requiring a prediction of two times of the pen pointer coordinates for which no motion information has been received on the basis of the display information and the electronic pen information.

The electronic device 101 may receive the first coordinate (100, 0), the second coordinate (130, 0), and the third coordinate (160, 0) regarding the motion information from the electronic pen 201 via the communication module 190, and may display the first pen pointer coordinate (100, 0) on the display module 160 on the basis of the first coordinate (100, 0) after a predetermined time (e.g., approximately 60 ms) from a time point of receiving the first coordinate (100, 0).

The electronic device 101 may display the first pen pointer coordinate (100, 0) corresponding to the first coordinate (100, 0) and the fourth pen pointer coordinate (160, 0) corresponding to the third coordinate (160, 0) on the basis of the motion information transmitted by the electronic pen 201, but the second pen pointer coordinate (120, 0) and the third pen pointer coordinate (140, 0) may need to be predicted and displayed on the display module 160.

The electronic device 101 may receive the first coordinate (100, 0), the second coordinate (130, 0), and the third coordinate (160, 0) regarding the motion information from the electronic pen 201 prior to displaying the first pen pointer coordinate (100, 0) on the display module 160. The electronic device 101 may predict and display on the display module 160 the second pen pointer coordinate (120, 0) and the third pen pointer coordinate (140, 0), which are intermediate coordinates on the basis of the first coordinate (100, 0), the second coordinate (130, 0), and the third coordinate (160, 0). The electronic device 101 may predict an intermediate coordinate on the basis of a direction and speed of movement of the coordinates based on the motion information. The electronic device 101 may determine and display on the display module 160 the second pen pointer coordinate (120, 0) and the third pen pointer coordinate (140, 0), which are intermediate coordinates on the basis of the first coordinate (100, 0), the second coordinate (130, 0), and the third coordinate (160, 0). The electronic device 101 may determine an intermediate coordinate on based on a direction and speed of movement of the coordinates associated the motion information.

Figure 15:
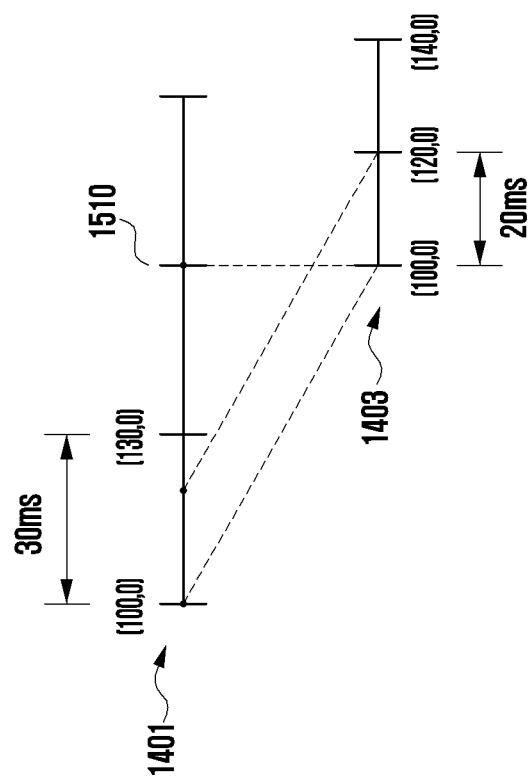
FIG. 15 illustrates a case in which a transmission delay of the electronic pen occurs once in FIG. 14.

FIG. 15 illustrates a case in which a transmission delay of the electronic pen 201 occurs once in FIG. 14.

The electronic device 101 may receive the first coordinate (100, 0) and the second coordinate (130, 0) regarding the motion information from the electronic pen 201 via the communication module 190, and may display the first pen pointer coordinate (100, 0) on the display module 160 on the basis of the first coordinate (100, 0) after a predetermined time (e.g., approximately 60 ms) from a time point of receiving the first coordinate (100, 0).

For example, due to noise, the electronic pen 201 may not be able to transmit the third coordinate (160,0) even after the first time (e.g., 30 ms) has elapsed due to a delay after transmitting the second coordinate (130,0), and may transmit the third coordinate (160,0) at a first delay time point 1510.

In various embodiments, the first delay time point 1510 is a time point of transmitting the third coordinate (160, 0) after transmitting the second coordinate (130, 0) of the electronic pen 201 and may exceed the first time (e.g., 30 ms). In various embodiments, the first delay time point 1510 may exceed a predetermined time (e.g., 60 ms), which is the time to delay displaying the pen pointer 610 on the display module 160 after receiving the motion information. For example, even though the first delay time point 1510 exceeds the predetermined time (e.g., 60 ms), the electronic device 101 may predict and display on the display module 160 the intermediate coordinates on the basis of the direction and speed of movement of the pen pointer coordinates based on the received motion information.

The electronic device 101 may display the first pen pointer coordinate (100, 0) corresponding to the first coordinate (100, 0) on the basis of the motion information transmitted by the electronic pen 201, but the second pen pointer coordinate (120, 0) may need to be predicted and displayed on the display module 160.

The electronic device 101 may receive the first coordinate (100, 0), the second coordinate (130, 0) regarding the motion information from the electronic pen 201 prior to displaying the first pen pointer coordinate (100, 0) on the display module 160.

Even though the electronic pen 201 transmits the third coordinate (160,0) at the first delay time point 1510, the electronic device 101 may predict and display on the display module 160 the second pen pointer coordinate (120,0), which is an intermediate coordinate on the basis of the first coordinate (100,0) and the second coordinate (130,0).

Figure 16:
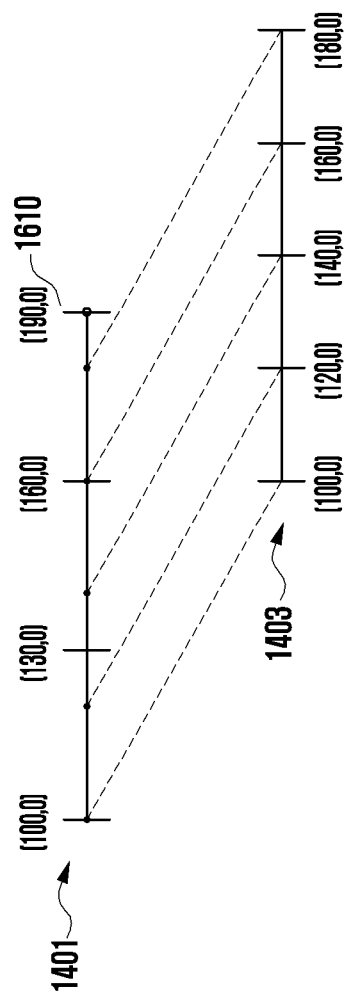
FIG. 16 illustrates a case in which the transmission delay of the electronic pen occurs twice in FIG. 14.

FIG. 16 illustrates a case in which the transmission delay of the electronic pen 201 occurs twice in FIG. 14.

The electronic device 101 may receive the first coordinate (100, 0) and the second coordinate (130, 0) regarding the motion information from the electronic pen 201 via the communication module 190, and may display the first pen pointer coordinate (100, 0) on the display module 160 on the basis of the first coordinate (100, 0) after a predetermined time (e.g., approximately 60 ms) from a time point of receiving the first coordinate (100, 0).

For example, due to noise, the electronic pen 201 may not be able to transmit the third coordinate (160,0) even after the first time (e.g., 30 ms) has elapsed due to a delay after transmitting the second coordinate (130,0), and may not be able to transmit the fourth coordinate (190,0) even after the first time (e.g., 30 ms) has elapsed two times. The electronic pen 201 may transmit the third coordinate (160,0) and the fourth coordinate (190,0) substantially simultaneously at a second delay time point 1610.

In various embodiments, the second delay time point 1610 may a time point of transmitting the third coordinate (160, 0) and the fourth coordinate (190, 0) of the electronic pen 201 after transmitting the second coordinate (130, 0), and may exceed the time that has elapsed the first time two times (e.g., 60 ms). In various embodiments, the second delay time point 1610 may exceed a predetermined time (e.g., 60 ms), which is the time to delay displaying the pen pointer 610 on the display module 160 after receiving the motion information.

The electronic device 101 may display the first pen pointer coordinate (100, 0) corresponding to the first coordinate (100, 0) on the basis of the motion information transmitted by the electronic pen 201, but the second pen pointer coordinate (120, 0) may need to be predicted and displayed on the display module 160.

The electronic device 101 may receive the first coordinate (100, 0), the second coordinate (130, 0) regarding the motion information from the electronic pen 201 prior to displaying the first pen pointer coordinate (100, 0) on the display module 160.

Even though the electronic pen 201 transmits the third coordinate (160,0) and the fourth coordinate (190,0) at the second delay time point 1610, the electronic device 101 may predict and display on the display module 160 the second pen pointer coordinate (120,0), which is an intermediate coordinate on the basis of the first coordinate (100,0) and the second coordinate (130,0). Further, the electronic device 101 may display the fourth pen pointer coordinate (160, 0) corresponding to the third coordinate (160, 0) by receiving the third coordinate (160, 0) and the fourth coordinate (190, 0) at the second delay time point (1610). The electronic device 101 may predict the third pen pointer coordinate (140, 0) on the basis of the third coordinate (160, 0) received at the second time delay time point 1610 and the previously received second coordinate (130, 0), and display the third pen pointer coordinate (140, 0) on the display module 160 in time for displaying the third pen pointer coordinate (140, 0).

Figure 17A:
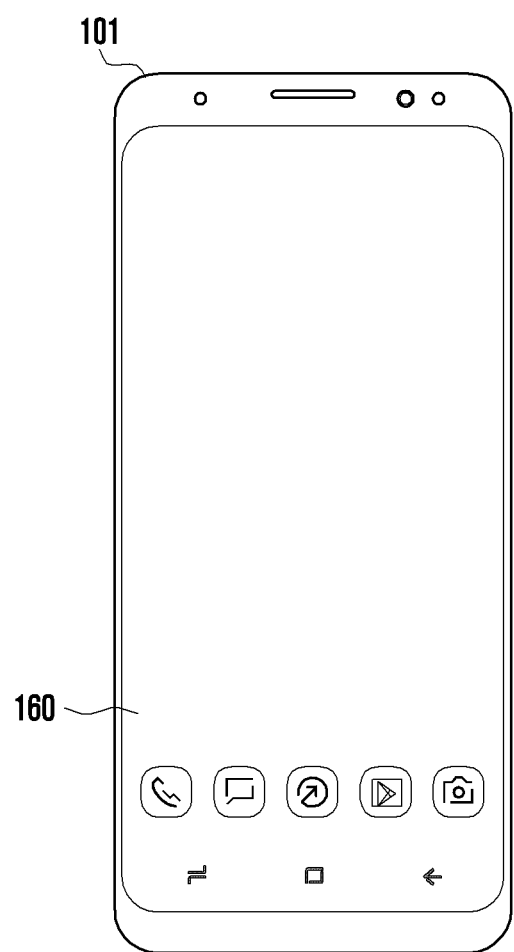
FIGS. 17A to 17C are views illustrating a method of displaying the pen pointer of the electronic device according to various embodiments of the present disclosure.
Figure 17B:
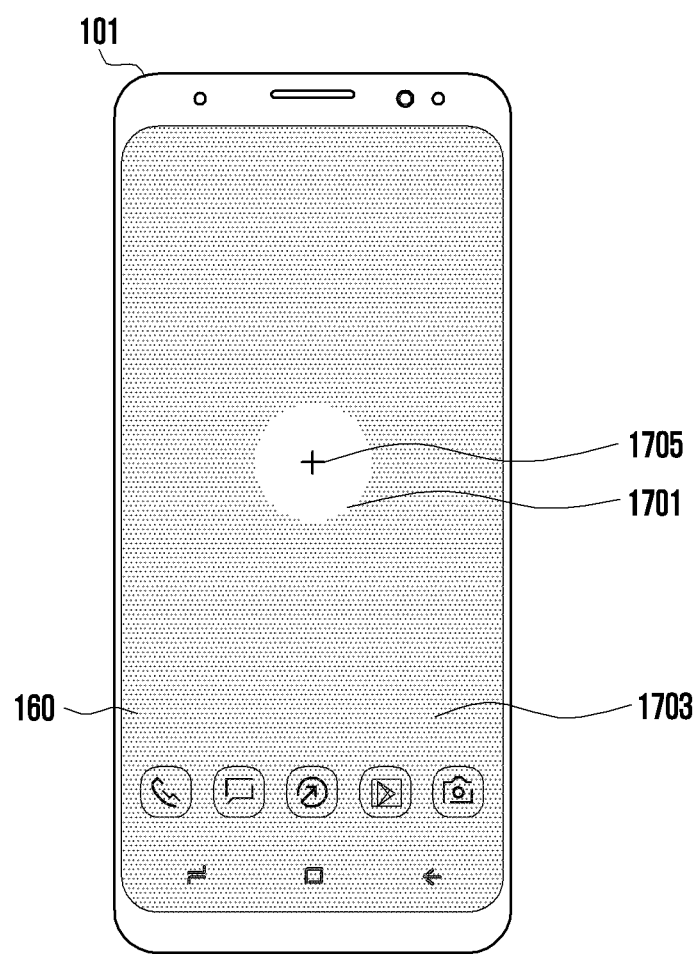
Figure 17C:
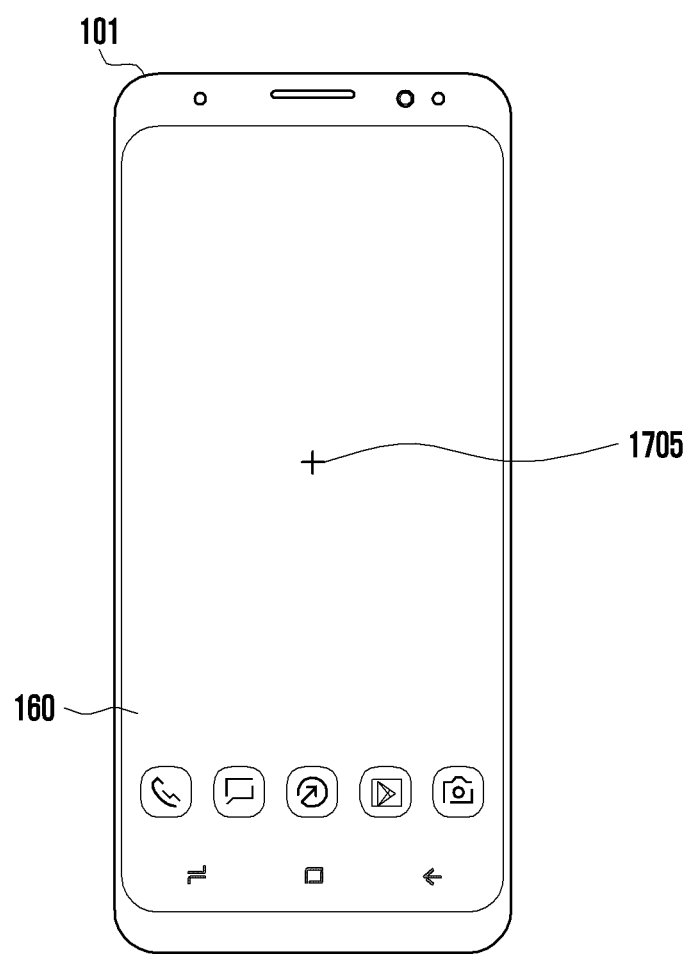

FIGS. 17A to 17C are views illustrating a method of displaying the pen pointer of the electronic device 101 according to various embodiments of the present disclosure.

FIG. 17A may be a screen prior to execution of the pen pointer using the electronic pen 201. The electronic device 101 may be a home screen and an application execution screen on the display module 160.

FIG. 17B may be a pen pointer execution screen using the electronic pen 201 with a highlight function. The electronic device 101 may display a highlight area 1701 centered on a pen pointer 1705 on a screen on the display module 160.

The electronic device 101 may distinctively display the highlight area 1701 and a non-highlight area 1703. For example, the electronic device 101 may make the non-highlighted area 1703 dark to display. In addition, the electronic device 101 may display the pen pointer 1705 in the center of the highlight area 1701. For example, the pen pointer 1705 may be cross-shaped, but a visual object indicating the pen pointer 1705 may include a variety of shapes.

FIG. 17C may be a pen pointer execution screen using the electronic pen 201. The electronic device 101 may display the pen pointer 1705 without using the highlight function.

For example, the pen pointer 1705 may be cross-shaped, but a visual object indicating the pen pointer 1705 may include a variety of shapes.

Figure 18A:
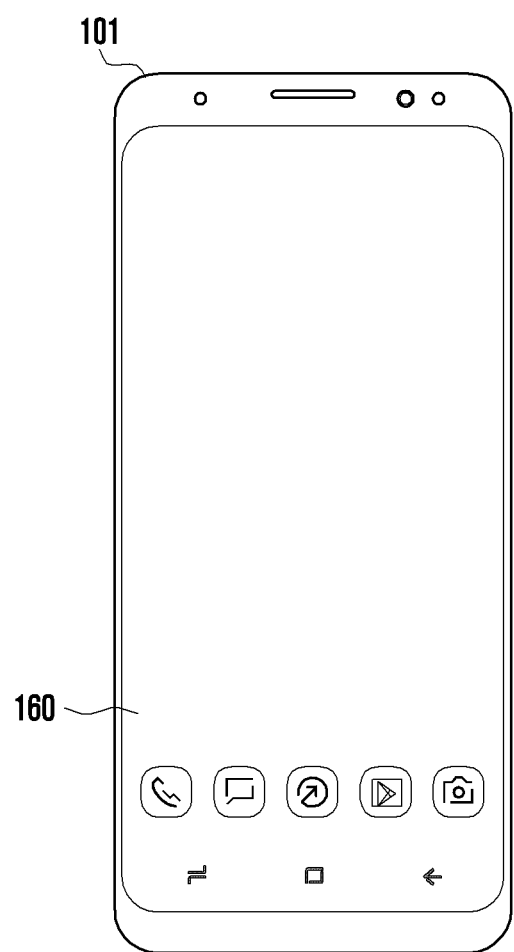
FIGS. 18A and 18B are views illustrating a method of displaying the pen pointer of the electronic device according to various embodiments of the present disclosure.
Figure 18B:
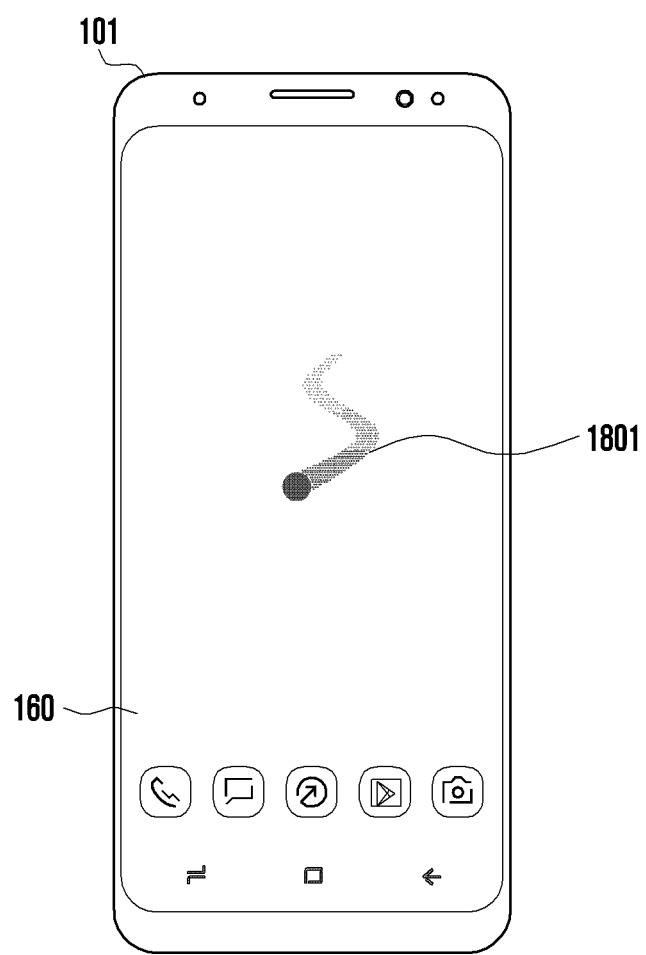

FIGS. 18A and 18B are views illustrating a method of displaying the pen pointer of the electronic device 101 according to various embodiments of the present disclosure.

FIG. 18A may be a screen prior to execution of the pen pointer using the electronic pen 201. The electronic device 101 may be a home screen and an application execution screen on the display module 160.

FIG. 18B may be a pen pointer execution screen using the electronic pen 201. The electronic device 101 may display a pen pointer 1801, and may temporarily display a movement trajectory of the pen pointer 1801 in the shape of a comet, for example, on the basis of the motion information of the electronic pen 201.

The electronic device according to various embodiments disclosed in the present document may be a device of various shapes. The electronic device may include, for example, a portable communication device (e.g., a smartphone), a computer device, a portable multimedia device, a portable medical device, a camera, a wearable device, or a home appliance. The electronic devices according to embodiments of the present document are not limited to the devices described above.

The various embodiments of the present document and the terms used therein are not intended to limit the technical features described in the present document to specific embodiments, but should be understood to include various modifications, equivalents, or substitutions of the corresponding embodiments. In connection with the description of the drawings, the similar reference numerals may be used for the similar or relevant constituent elements. The singular form of a noun corresponding to an item may include one or more of the items, unless the relevant context clearly indicates otherwise. In the present document, each of the phrases "A or B," "at least one of A and B," "at least one of A or B," "A, B or C," "at least one of A, B and C," and "at least one of A, B, or C" may include any of the items listed together in the corresponding phrase among those phrases, or any possible combination thereof. The terms such as "first", "second", or "first" or "second" may be used simply to distinguish a constituent element from other corresponding constituent elements and do not limit the constituent elements in any other respect (e.g., importance or order). In case that any (e.g., a first) constituent element is referred to as "coupled" or "connected" to another (e.g., a second) constituent element, with or without the terms "functionally" or "communicationally", it means that the constituent element may be connected to the other constituent element directly (e.g., wired), wirelessly, or through a third constituent element.

As used in various embodiments of the present document, the term "module" may include a unit implemented in hardware, software, or firmware, and may be used interchangeably with terms such as logic, logic block, component, or circuit, for example. The module may be a component that is integrally constituted, or a minimum unit of the component, or a part thereof, that performs one or more functions. For example, according to an embodiment, the module may be implemented in the form of an application-specific integrated circuit (ASIC).

Various embodiments of the present document may be implemented as software (e.g., the program 140) including one or more instructions stored on a storage medium (e.g., the internal memory 136 or external memory 138) readable by a machine (e.g., the electronic device 101). For example, a processor (e.g., the processor 120) of the machine (e.g., the electronic device 101) may call and execute at least one of one or more instructions stored on the storage medium. This enables the machine to be operated to perform at least one function according to the at least one instruction called. One or more of the instructions that are described above may include code generated by a compiler or code that may be executed by an interpreter. The machine-readable storage medium may be provided in the form of a non-transitory storage medium. Here, "non-transitory" only means that the storage medium is a tangible device and does not include signals (e.g., electromagnetic waves), and this term does not distinguish between the case where the data is stored on the storage medium permanently and the case where the data is stored temporarily.

In some embodiments, methods according to various embodiments disclosed herein may be provided in a computer program product. The computer program product is a commodity and may be traded between a seller and a buyer. The computer program product may be distributed in the form of a device-readable storage medium (e.g., compact disc read only memory (CD-ROM)), or it may be distributed online (e.g., downloaded or uploaded) through an application store (e.g., Play Store™) or directly between two user devices (e.g., smartphones). In case of online distribution, at least a portion of the computer program product may be stored, or at least temporarily generated, on a device-readable storage medium, such as a manufacturer's server, an application store's server, or a memory of a relay server.

According to various embodiments, each constituent element (e.g., module or program) of the above-described constituent elements may include a single or plurality of objects, and some of the plurality of objects may be disposed separately in different constituent elements. In various embodiments, one or more constituent elements of the corresponding constituent elements described above or operations may be omitted, or one or more other constituent elements or operations may be added. Alternatively or additionally, a plurality of constituent elements (e.g., modules or programs) may be integrated into a single constituent element. In this case, the integrated constituent element may perform one or more functions of the constituent element of each of the plurality of constituent elements in the same or similar manner as performed by the corresponding constituent element of the plurality of constituent elements prior to the integration. According to various embodiments, the operations performed by a module, program, or other constituent element may be executed sequentially, in parallel, iteratively, or heuristically, or one or more of the above operations may be executed in a different order, omitted, or one or more other operations may be added.

What is claimed is:

1. An electronic device comprising:
    a communication module;
    a memory to store instructions;
    a display; and
    a processor,
    wherein the instructions that, when executed by the processor, cause the electronic device to:
        determine that an electronic pen event associated with an electronic pen occur;
        receive one or more pieces of motion information from the electronic pen at a first time interval;
        store one or more pieces of motion information into the memory;
        determine pen pointer coordinates on the display based on the one or more pieces of motion information at a second time interval:
        determine intermediate pen pointer coordinates on the display at an intermediate time interval between the first time interval and the second time interval when the first time interval is ater the second time interval based on the determined pen pointer coordinates; and
        display a pen pointer on the display based on the determined pen pointer coordinates, the intermediate pen pointer coordinates, and one or more pieces of motion information.

2. The electronic device of claim 1, wherein the instructions that, when executed by the processor, cause the electronic device to:
    display the pen pointer on the display based on determining that the electronic pen event is being executed, and
    wherein a piece of motion information among the one or more pieces of motion information comprises position information of the electronic pen or movement information of the electronic pen based on data obtained from at least one or more sensors of the electronic pen.

3. The electronic device of claim 1, wherein the instructions that, when executed by the processor, cause the electronic device to:
    identify display information on the display display, and
    receive electronic pen information from the electronic pen through the communication module.

4. The electronic device of claim 3, wherein the display information comprises a screen refresh rate of the display, and
    wherein the electronic pen information comprises a transmission rate of coordinates information of the electronic pen.

5. The electronic device of claim 3, wherein the instructions that, when executed by the processor, cause the electronic device to;
    ed-to-determine a pen pointer operation based on the display information and the electronic pen information.

6. The electronic device of claim 5, wherein the instructions that, when executed by the processor, cause the electronic device to:
    while not receiving the motion information on the electronic pen, determine a time interval for determining respective pen pointer coordinates and displaying the respective pen pointer coordinates or determine a number of times that the display determines the respective pen pointer coordinates and displays the respective pen pointer coordinates.

7. The electronic device of claim 5, wherein the instructions that, when executed by the processor, cause the electronic device to:
    control a display operation based on the pen pointer operation;
    control a delay time to display the pen pointer on the display after receiving the motion information; and
    determine delayed coordinates of the pen pointer based on a movement direction and speed of coordinates associated with the motion information.

8. A method of displaying an electronic pen pointer on an electronic device comprising:
    determining that an electronic pen event associated with an electronic pen occur;
    receiving one or more pieces of motion information from the electronic pen at a first time interval;
    storing one or more pieces of motion information into a memory;
    determining pen pointer coordinates on a display based on the one or more pieces of motion information at a second time interval:
    determining intermediate pen pointer coordinates on the display at an intermediate time interval between the first time interval and the second time interval when the first time interval is greater than the second time interval based on the determined pen pointer coordinates; and
    displaying a pen pointer on the display based on the determined pen pointer coordinates, the intermediate pen pointer coordinates, and one or more pieces of motion information.

9. The method of claim 8, wherein the determining that the electronic pen event is being executed further comprises identifying the execution of the electronic pen event and displaying the pen pointer on the display.

10. The method of claim 8, wherein a piece of motion information among the one or more pieces of motion information comprises position information of the electronic pen or movement information of the electronic pen based on data obtained from at least one or more sensors of the electronic pen.

11. The method of claim 8, wherein the determining the pen pointer coordinates on the display further comprises identifying display information on the display, and receiving electronic pen information from the electronic pen through a communication module.

12. The method of claim 11, wherein the display information comprises a screen refresh rate of the display, and
    wherein the electronic pen information comprises a transmission rate of coordinates information of the electronic pen.

13. The method of claim 11, wherein the determining the pen pointer coordinates on the display further comprises determining a pen pointer operation based on the display information and the electronic pen information.

14. The method of claim 13, wherein the determining the pen pointer operation further comprises determining, while not receiving the motion information on the electronic pen, a time interval for determining respective pen pointer coordinates and displaying the respective pen pointer coordinates or a number of times the display determines respective pen pointer coordinates and displaying the respective pen pointer coordinates.

15. The method of claim 13, wherein the determining the pen pointer coordinates on the display comprises controlling a display operation based on the determined pen pointer operation, and
   wherein the controlling the display operation comprises:
   controlling a delay time to display the pen pointer on the display after receiving the motion information; and
   determining delayed coordinates of the pen pointer based on a movement direction and speed of coordinates associated with the motion information.

\* \* \* \* \*